United States Patent
Kim et al.

(10) Patent No.: US 11,886,361 B2
(45) Date of Patent: Jan. 30, 2024

(54) MEMORY CONTROLLER AND OPERATING METHOD THEREOF

(71) Applicant: SK hynix Inc., Gyeonggi-do (KR)

(72) Inventors: Young Jo Kim, Gyeonggi-do (KR); Sung Yeob Cho, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 280 days.

(21) Appl. No.: 16/564,898

(22) Filed: Sep. 9, 2019

(65) Prior Publication Data

US 2020/0250113 A1 Aug. 6, 2020

(30) Foreign Application Priority Data

Jan. 31, 2019 (KR) .......................... 10-2019-0012845

(51) Int. Cl.
G06F 13/16 (2006.01)
G06F 13/40 (2006.01)
(Continued)

(52) U.S. Cl.
CPC .......... G06F 13/1673 (2013.01); G06F 3/061 (2013.01); G06F 3/064 (2013.01);
(Continued)

(58) Field of Classification Search
CPC ............... G06F 13/1673; G06F 13/404; G06F 12/0246; G06F 3/0659; G06F 3/0679;
(Continued)

(56) References Cited

U.S. PATENT DOCUMENTS 10,732,847 B2 * 8/2020 Bazarsky ............... G11C 29/52
2011/0138100 A1 * 6/2011 Sinclair ............... G06F 12/0246
711/5
(Continued)

FOREIGN PATENT DOCUMENTS

CN 103176752 A 6/2013
CN 106294215 A 1/2017
(Continued)

OTHER PUBLICATIONS

Office Action for the Chinese Patent Application No. 201910975922.7 issued by the Chinese Patent Office dated Jan. 4, 2023.
(Continued)

Primary Examiner — David Yi
Assistant Examiner — Alan Otto
(74) Attorney, Agent, or Firm — IP & T GROUP LLP

(57) ABSTRACT

A memory controller having an improved operating speed controls a memory device in response to a request from a host. The memory controller includes: a processor for driving firmware for controlling communication between the host and the memory device; a map data receiver for receiving map data including a plurality of mapping entries including physical block addresses, for operations to be performed on the memory device from the memory device under the control of the processor; and a map data controller for checking a mapping entry corresponding to the request, which are received from the map data receiver, snooping the detected mapping entry and outputting the detected mapping entry to the processor.

16 Claims, 16 Drawing Sheets

(51) Int. Cl.
*G06F 12/02* (2006.01)
*G06F 3/06* (2006.01)

(52) U.S. Cl.
CPC .......... *G06F 3/0659* (2013.01); *G06F 3/0679* (2013.01); *G06F 12/0246* (2013.01); *G06F 13/404* (2013.01); *G06F 2212/7201* (2013.01)

(58) Field of Classification Search
CPC .. G06F 3/061; G06F 3/064; G06F 2212/7201; G06F 3/0656; G06F 12/0607; G06F 2212/7208; G06F 2212/7203
See application file for complete search history.

(56) References Cited

U.S. PATENT DOCUMENTS

| | | | |
|---|---|---|---|
| 2014/0047210 A1 | 2/2014 | Cohen et al. | |
| 2017/0024127 A1 | 1/2017 | Bazarsky et al. | |
| 2019/0332320 A1* | 10/2019 | Wu | G06F 3/0616 |
| 2020/0050393 A1* | 2/2020 | Patel | G06F 3/0679 |

FOREIGN PATENT DOCUMENTS

| | | |
|---|---|---|
| CN | 108280033 A | 7/2018 |
| CN | 108701086 A | 10/2018 |
| CN | 108780423 A | 11/2018 |
| CN | 108804023 A | 11/2018 |
| CN | 109074228 A | 12/2018 |
| CN | 109213705 A | 1/2019 |
| CN | 111506515 B | 11/2023 |
| KR | 10-2015-0015764 | 2/2015 |
| KR | 10-2018-0049338 | 5/2018 |
| WO | 2008070813 A2 | 6/2008 |

OTHER PUBLICATIONS

Notice of Allowance for the Chinese Patent Application No. 201910975922.7 issued by the Chinese Patent Office dated Oct. 8, 2023.
Cancan Peng, "Design and Implementation of Distributed Cache System based on SDN Controller Cluster", Sep. 2017.
Amor Awad et al., "Silent Shredder: Zero-Cost Shredding for Secure Non-Volatile Main Memory Controllers", Hewlett-Packard Labs, Feb. 11, 2016.

* cited by examiner

| MAP_DATA | Mapping_ENT | Logical Block Address (LBA) | Physical Block Address (PBA) |
|---|---|---|---|
| MAP_DATA1 | Mapping_ENT11 | LBA1 | PBA1 |
| | Mapping_ENT12 | LBA2 | PBA2 |
| | Mapping_ENT13 | LBA3 | PBA3 |
| | Mapping_ENT14 | LBA4 | PBA4 |

FIG. 5

| REQUESTED LBA STORAGE | MARKING VALUE (S501) | MARKING VALUE (S503) |
|---|---|---|
| FIRST REQUESTED LBA (REQ_LBA1) | 0 | 1 |
| SECOND REQUESTED LBA (REQ_LBA2) | 0 | 0 |
| THIRD REQUESTED LBA (REQ_LBA3) | 0 | 0 |

FIG. 6

| MAP_DATA | Mapping_ENT | Logical Block Address (LBA) | Physical Block Address (PBA) |
|---|---|---|---|
| MAP_DATA1 | Mapping_ENT11 | LBA1 | PBA1 |
| | Mapping_ENT12 | LBA2 | PBA2 |
| | Mapping_ENT13 | LBA3 | PBA3 |
| | Mapping_ENT14 | LBA4 | PBA4 |
| MAP_DATA2 | Mapping_ENT21 | LBA5 | PBA5 |
| | Mapping_ENT22 | LBA6 | PBA6 |
| | Mapping_ENT23 | LBA7 | PBA7 |
| | Mapping_ENT24 | LBA8 | PBA8 |
| MAP_DATA3 | Mapping_ENT31 | LBA9 | PBA9 |
| | Mapping_ENT32 | LBA10 | PBA10 |
| | Mapping_ENT33 | LBA11 | PBA11 |
| | Mapping_ENT34 | LBA12 | PBA12 |

FIG. 7

| REQUESTED LBA STORAGE | CONSECUTIVE VALUE |
|---|---|
| FIRST REQUESTED LBA (REQ_LBA1) | 3 |
| SECOND REQUESTED LBA (REQ_LBA2) | . |
| THIRD REQUESTED LBA (REQ_LBA3) | . |

FIG. 8

| MAP_DATA | Mapping_ENT | Logical Block Address (LBA) | Physical Block Address (PBA) |
|---|---|---|---|
| MAP_DATA1 | Mapping_ENT11 | LBA1 | PBA1 |
| | Mapping_ENT12 | LBA2 | PBA2 |
| | Mapping_ENT13 | LBA3 | PBA3 |
| | Mapping_ENT14 | LBA4 | PBA4 |
| MAP_DATA2 | Mapping_ENT21 | LBA5 | PBA5 |
| | Mapping_ENT22 | LBA6 | PBA6 |
| | Mapping_ENT23 | LBA7 | PBA7 |
| | Mapping_ENT24 | LBA8 | PBA8 |

MEMORY CONTROLLER AND OPERATING METHOD THEREOF

CROSS-REFERENCE TO RELATED APPLICATION

The present application claims priority under 35 U.S.C. § 119(a) to Korean patent application number 10-2019-0012845, filed on Jan. 31, 2019, which is incorporated herein by reference in its entirety.

BACKGROUND

Field of Invention

The present disclosure generally relates to an electronic device, and more particularly, to a memory controller and an operating method thereof.

Description of Related Art

A storage device typically stores data under the control of a host device such as a computer, a smart phone or a smart pad. The storage device may be a device configured to store data on a magnetic disk, such as a Hard Disk Drive (HDD), and a device configured to store data on a semiconductor memory, i.e., a nonvolatile memory, such as a Solid State Drive (SSD) or a memory card.

The storage device may include a memory device configured to store data and a memory controller configured to control the memory device. The memory device is classified into a volatile memory device and a nonvolatile memory device. The nonvolatile memory device includes a Read Only Memory (ROM), a Programmable ROM (PROM), an Electrically Programmable ROM (EPROM), an Electrically Erasable and Programmable ROM (EEPROM), a flash memory, a Phase-change RAM (PRAM), a Magnetic RAM (MRAM), a Resistive RAM (ReRAM), a Ferroelectric RAM (FRAM), and the like.

SUMMARY

Embodiments provide a memory controller having an improved operating speed and an operating method thereof.

In accordance with an aspect of the present disclosure, there is provided a memory controller for controlling a memory device in response to a request from a host, the memory controller including: a processor configured to drive firmware for controlling communication between the host and the memory device, a map data receiver configured to receive map data including a plurality of mapping entries, including physical block addresses, for operations to be performed on the memory device, from the memory device under the control of the processor, and a map data controller configured to detect a mapping entry corresponding to the request, which are received from the map data receiver, snoop the detected mapping entry and output the detected mapping entry to the processor.

In accordance with another aspect of the present disclosure, there is provided a method for operating a memory controller for controlling a memory device in response to a request from a host, the method including: receiving map data including a plurality of mapping entries, including physical block addresses, for operations to be performed on the memory device, from the memory device, detecting a mapping entry corresponding to the request among the plurality of mapping entries and snooping the detected mapping entry and outputting the detected mapping entry to a processor included in the memory controller.

In accordance with another aspect of the present disclosure, there is provided a method for operating a memory controller for controlling a memory device in response to a request from a host, the method including: caching plural map entries provided from a memory device, each map entry representing a mapping relationship between a logical address and a physical address, snooping, during the caching, the map entries being cached, detecting, during the caching, a map entry having a requested logical address provided from a host among the snooped map entries and controlling the memory device to perform an operation according to the detected map entry in response to a request provided along with the requested logical address from the host.

BRIEF DESCRIPTION OF THE DRAWINGS

Example embodiments will now be described more fully hereinafter with reference to the accompanying drawings; however, the examples may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

FIG. 5 is a diagram illustrating a method for outputting a plurality of target entries from a requested logical address storage.

FIG. 6 is a diagram illustrating a method for outputting mapping entries corresponding to the target entries shown in FIG. 5 when the target entries are output.

FIG. 7 is a diagram illustrating a method for displaying consecutive target entries, when a plurality of target entries are consecutive.

FIG. 8 is a diagram illustrating a method for outputting mapping entries from a mapping entry storage, when the target entries shown in FIG. 7 are consecutive.

DETAILED DESCRIPTION

Figure 1:
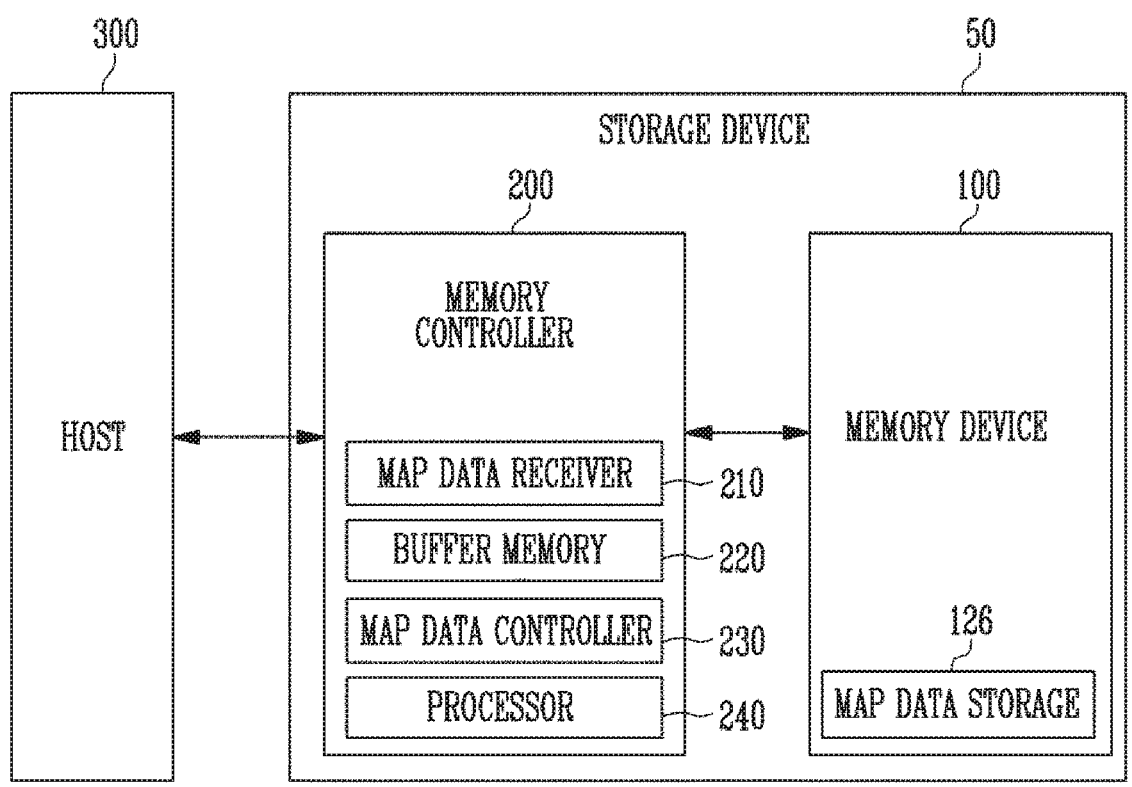
FIG. 1 is a block diagram illustrating a storage device.

The specific structural or functional description disclosed herein is merely illustrative for the purpose of describing embodiments according to the concept of the present disclosure. The embodiments according to the concept of the present disclosure can be implemented in various forms, and cannot be construed as limited to the embodiments set forth herein.

The embodiments according to the concept of the present disclosure can be variously modified and have various shapes. Thus, the embodiments are illustrated in the drawings and are intended to be described herein in detail. However, the embodiments according to the concept of the present disclosure are not construed as limited to specified disclosures, and include all changes, equivalents, or substitutes that do not depart from the spirit and technical scope of the present disclosure.

While terms such as "first" and "second" may be used to describe various components, such components must not be understood as being limited to the above terms. The above terms are used only to distinguish one component from another. For example, a first component may be referred to as a second component without departing from the scope of rights of the present disclosure, and likewise a second component may be referred to as a first component.

It will be understood that when an element is referred to as being "connected" or "coupled" to another element, it can be directly connected or coupled to the other element or intervening elements may also be present. In contrast, when an element is referred to as being "directly connected" or "directly coupled" to another element, no intervening elements are present. Meanwhile, other expressions describing relationships between components such as "~ between," "immediately ~ between" or "adjacent to ~" and "directly adjacent to ~" may be construed similarly.

The terms used in the present application are merely used to describe particular embodiments, and are not intended to limit the present disclosure. Singular forms in the present disclosure are intended to include the plural forms as well, unless the context clearly indicates otherwise. It will be further understood that terms such as "including" or "having," etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

So far as not being differently defined, all terms used herein including technical or scientific terminologies have meanings that they are commonly understood by those skilled in the art to which the present disclosure pertains. The terms having the definitions as defined in the dictionary should be understood such that the terms have meanings consistent with the context of the related technique. So far as not being clearly defined in this application, terms should not be understood in an ideally or excessively formal way.

In describing those embodiments, description will be omitted for techniques that are well known to the art to which the present disclosure pertains, and are not directly related to the present disclosure. This intends to disclose the gist of the present disclosure more clearly by omitting unnecessary description.

Hereinafter, exemplary embodiments of the present disclosure will be described in detail with reference to the accompanying drawings in order for those skilled in the art to be able to readily implement the technical spirit of the present disclosure.

FIG. 1 is a block diagram illustrating a storage device.

Referring to FIG. 1, the storage device 50 may include a memory device 100 and a memory controller 200.

The storage device 50 may be a device for storing data under the control of a host 300, such as a mobile phone, a smart phone, an MP3 player, a laptop computer, a desktop computer, a game console, a TV, a tablet PC or an in-vehicle infotainment.

The storage device 50 may be manufactured as any one of various types of storage devices according to a host interface that is a communication scheme with the host 300. For example, the storage device 50 may be implemented with any one of various types of storage devices such as a Solid State Drive (SSD), a Multi-Media Card (MMC) of an embedded Multi-Media Card (eMMC), a Reduced Size, Multi-Media Card (RS-MMC), and a micro-Multi-Media Card (micro-MMC) type, a Secure Digital (SD) card of a Secure Digital (SD), a mini-Secure Digital (mini-SD) and a micro-Secure Digital (micro-SD) type, an Universal Serial Bus (USB) storage device, a Universal Flash Storage (UFS) device, a storage device of a Personal Computer Memory Card International Association (PCMCIA) card type, a storage device of a Peripheral Component Interconnection (PCI) card type, a storage device of a PCI-Express (PCIe) card type, a Compact Flash (CF) card, a smart media card, and a memory stick.

The storage device 50 may be manufactured as any one of various package types. For example, the storage device 50 may be manufactured as any one of various package types such as a Package-On-Package (POP), a System-In-Package (SIP), a System-On-Chip (SOC), a Multi-Chip Package (MCP), a Chip-On-Board (COB), a Wafer-level Fabricated Package (WFP), and a Wafer-level Stack Package (WSP).

The memory device 100 may store data. The memory device 100 operates under the control of the memory controller 200. The memory device 100 may include a memory cell array including a plurality of memory cells for storing data. The memory cell array may include a plurality of planes. Each plane may include a plurality of memory blocks BLK1 to BLKz. Each memory block may include a plurality of memory cells. One memory block may include a plurality of pages. In an embodiment, the page may be a unit for storing data in the memory device 100 or reading data stored in the memory device 100. The memory block may be a unit for erasing data. In an embodiment, the memory device 100 may be a Double Data Rate Synchronous Dynamic Random Access Memory (DDR SDRAM), a Low Power Double Data Rate 4 (LPDDR4) SDRAM, a Graphics Double Data Rate (GDDR) SRAM, a Low Power DDR (LPDDR), a Rambus Dynamic Random Access Memory (RDRAM), a NAND flash memory, a vertical NAND flash memory, a NOR flash memory, a Resistive Random Access Memory (RRAM), a Phase-Change Random Access Memory (PRAM), a Magnetoresistive Random Access Memory (MRAM), a Ferroelectric Random Access Memory (FRAM), a Spin Transfer Torque Random Access Memory (STT-RAM), or the like. In this specification, for convenience of description, a case where the memory device 100 is a NAND flash memory is described.

In an embodiment, the memory device 100 may be implemented in a three-dimensional array structure. The present disclosure may be applied to not only a flash memory device in which a charge storage layer is configured with a Floating Gate (FG) but also a Charge Trap Flash (CTF) in which a charge storage layer is configured with an insulating layer.

In an embodiment, each of the memory cells included in the memory device 100 may be configured as a Single Level Cell (SLC) for storing one data bit. Also, each of the memory cells included in the memory device 100 may be configured as a Multi-Level Cell (MLC) for storing two data bits, a Triple Level Cell (TLC) for storing three data bits, or a Quad Level Cell (QLC) for storing four data bits.

The memory device 100 is configured to receive a command and an address from the memory controller 200 and access an area selected by the address in the memory cell array. That is, the memory device 100 may perform an operation corresponding to the command on the area selected by the address. For example, the memory device 100 may perform a write (program) operation, a read operation, and an erase operation. In the program operation, the memory device 100 may program data in the area selected by the address. In the read operation, the memory device 100 may read data from the area selected by the address. In the erase operation, the memory device 100 may erase data stored in the area selected by the address.

The memory device 100 may perform a program operation or erase operation by using a set operating voltage under the control of the memory controller 200.

In an embodiment, the memory device 100 may include a map data storage 126. The map data storage 126 may receive map data MAP_DATA from the memory controller 200, when the memory device 100 performs a program operation. The map data MAP_DATA may be data stored in a Flash Translation Layer (FTL) in the memory controller 200. The map data MAP_DATA may establish a mapping relationship between Logical Block Addresses (LBAs) and Physical Block Addresses (PBAs). Also, the map data MAP_ DATA may be configured with a plurality of mapping entries Mapping_ENT.

Specifically, the map data storage 126 may store map data MAP_DATA. That is, the map data storage 126 may store mapping entries Mapping_ENT included in the map data MAP_DATA. The map data MAP_DATA may be received from the FTL in the memory controller 200. The memory device 100 may output the map data MAP_DATA to a map data receiver 210 in response to a request from the memory controller 200.

The memory controller 200 may control overall operations of the storage device 50.

When power is applied to the storage device 50, the memory controller 200 may execute firmware (FW). When the memory device 100 is a flash memory device, the memory controller 200 may execute FW such as an FTL for controlling communication between the host 300 and the memory device 100.

In an embodiment, the memory controller 200 may receive data and an LBA from the host 300, and translate the LBA into a PBA representing addresses of memory cells included in the memory device 100, in which data is to be stored. Also, the memory controller 200 may store, in a buffer memory 220, logical-physical address mapping information that establishes a mapping relationship between the LBA and the PBA.

The memory controller 200 may control the memory device 100 to perform a program operation, a read operation, an erase operation, or the like in response to a request from the host 300. That is, the memory controller 200 may control the memory device 100 in response to the request from the host 300.

In an embodiment, in the program operation, the memory controller 200 may provide a program command, a PBA, and data to the memory device 100. In the read operation, the memory controller 200 may provide a read command and a PBA to the memory device 100. In the erase operation, the memory controller 200 may provide an erase command and a PBA to the memory device 100.

In an embodiment, the memory controller 200 may autonomously generate a program command, an address, and data without any request from the host 300, and transmit the program command, the address, and the data to the memory device 100. For example, the memory controller 200 may provide the command, the address, and the data to the memory device 100 to perform background operations such as a program operation for wear leveling and a program operation for garbage collection.

In an embodiment, the memory controller 200 may include the map data receiver 210. The map data receiver 210 may receive map data MAP_DATA from the memory device 100. The map data MAP_DATA may include mapping entries Mapping_ENT. The mapping entry Mapping_ENT may establish a mapping relationship between one LBA and one PBA. The map data receiver 210 may output the map data MAP_DATA received from the memory device 100 to a map data controller 230 and/or the buffer memory 220.

The map data receiver 210 may receive map data MAP_ DATA including a plurality of mapping entries with respect to the memory device 100 from the memory device 100 under the control of a processor 240. That is, when the processor 240 receives a request message REQ_MSG from the host 300, the processor 240 may control the map data receiver 210 to receive the map data MAP_DATA from the memory device 100.

In an embodiment, the memory controller 200 may include the buffer memory 220. The buffer memory 220 may receive map data MAP_DATA from the map data receiver 210. Specifically, the buffer memory 220 may store mapping entries Mapping_ENT included in the map data MAP_ DATA, of which number corresponds to the capacity of the buffer memory 220.

While the map data MAP_DATA is being stored in the buffer memory 220, the buffer memory 220 may search for a map entry corresponding to a requested logical block address REQ_LBA among the mapping entries Mapping_ENT included in the map data MAP_DATA. The requested logical block address REQ_LBA may be provided along with the request message REQ_MSG from the host 300. The buffer memory 220 may output a mapping entry Mapping_ENT having the requested logical block address REQ_LBA to the processor 240.

In an embodiment, the memory controller 200 may include the map data controller 230. The map data controller 230 may sequentially receive mapping entries Mapping_ENT included in map data MAP_DATA from the map data receiver 210. Also, the map data controller 230 may receive a requested logical block address REQ_LBA from the processor 240. The requested logical block address REQ_LBA may be provided along with the request message REQ_MSG from the host 300.

The map data controller 230 may output a mapping entry Mapping_ENT to the processor 240, based on whether the mapping entry Mapping_ENT has the requested logical block address REQ_LBA. Therefore, when the mapping entry Mapping_ENT includes the requested logical block address REQ_LBA, the map data controller 230 may output the mapping entry Mapping_ENT received from the map data receiver 210 to the processor 240.

In an embodiment, the memory controller 200 may include the processor 240. The processor 240 may drive software or firmware. The firmware may control communication between the host 300 and the memory device 100. The processor 240 may drive the firmware.

The processor 240 may receive a request message REQ_MSG along with a requested logical address REQ_LBA from the host 300. The processor 240 may output the requested logical block address REQ_LBA to the map data controller 230 and/or the buffer memory 220 to perform an operation corresponding to the request message REQ_MSG received from the host 300. The processor 240 may receive a mapping entry Mapping_ENT having the requested logical block address REQ_LBA from the map data controller 230 and/or the buffer memory 220.

When the processor 240 receives the mapping entry Mapping_ENT from the map data controller 230 and/or the buffer memory 220, the processor 240 may generate and output operation data OP_DATA for performing an operation corresponding to the request message REQ_MSG received from the host 300. The operation data OP_DATA may include a command for allowing an operation to be performed in the memory device, an address, and data. The memory device 100 may perform an operation corresponding to the request message REQ_MSG received from the host 300, based on the operation data OP_DATA.

In an embodiment, the memory controller 200 may control at least two memory devices 100. The memory controller 200 may control the memory devices according to an interleaving scheme so as to improve operational performance.

The host 300 may communicate with the storage device 50, using at least one of various communication interfaces, such as a Universal Serial bus (USB), a Serial AT Attachment (SATA), a High Speed InterChip (HSIC), a Small Computer System Interface (SCSI), Firewire, a Peripheral Component Interconnection (PCI), a PCI express (PCIe), a Non-Volatile Memory express (NVMe), a Universal Flash Storage (UFS), a Secure Digital (SD), a Multi-Media Card (MMC), an embedded MMC (eMMC), a Dual In-line Memory Module (DIMM), a Registered DIMM (RDIMM), and a Load Reduced DIMM (LRDIMM).

Figure 2:
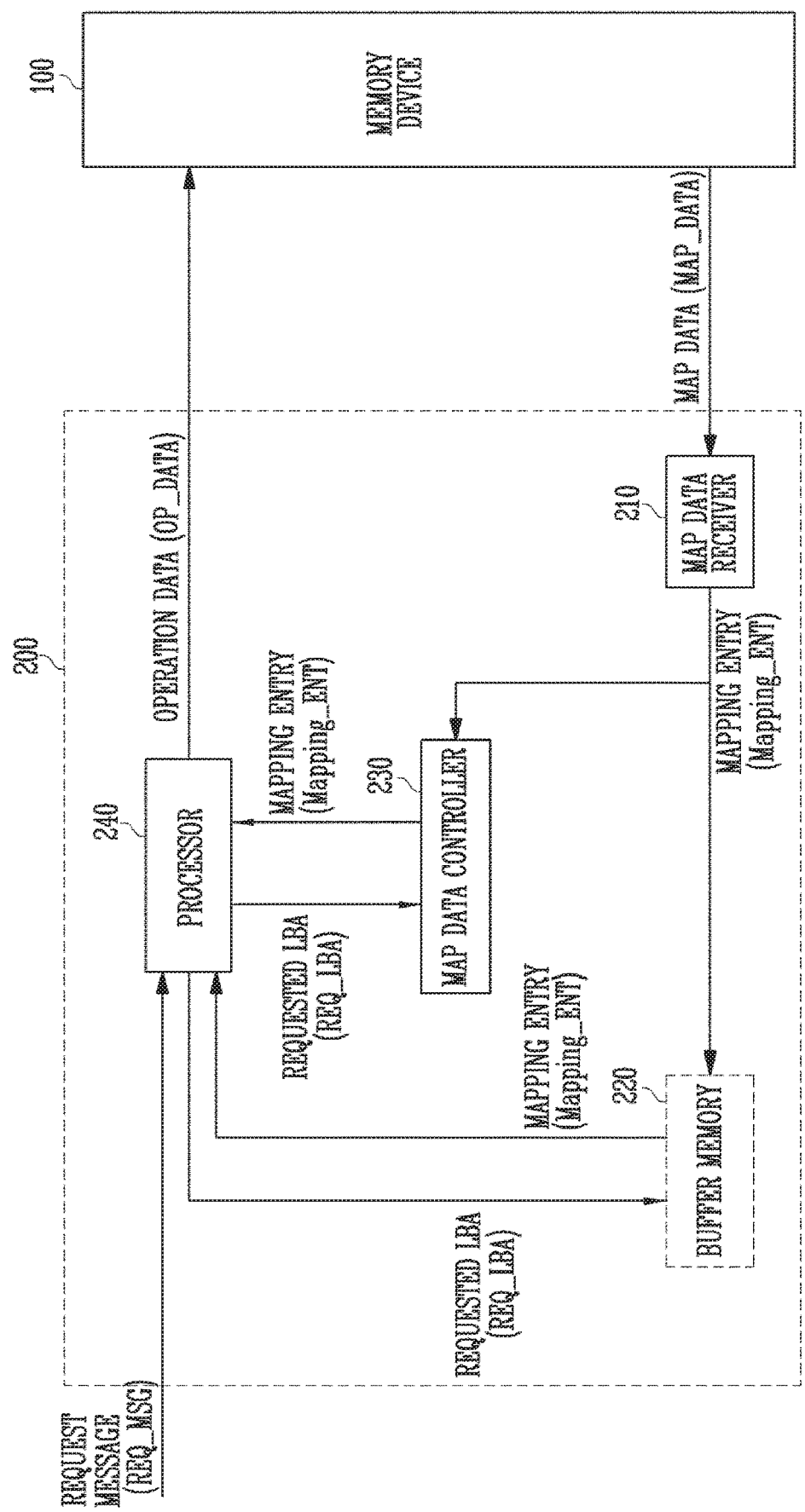
FIG. 2 is a diagram illustrating a configuration and an operation of a memory controller shown in FIG. 1.

FIG. 2 is a diagram illustrating a configuration and an operation of the memory controller shown in FIG. 1.

Referring to FIG. 2, the memory controller 200 may include a map data receiver 210, a buffer memory 220, a map data controller 230, and a processor 240. The memory controller 200 may not include the buffer memory 220.

When the memory controller 200 does not include the buffer memory 220, the memory controller 200 may be configured with the map data receiver 210, the map data controller 230, and the processor 240.

The map data receiver 210 may be included in a memory interface. That is, the map data receiver 210 may receive map data MAP_DATA from the memory device 100, and output the received map data MAP_DATA. The map data MAP_DATA may include mapping entries Mapping_ENT. The mapping entry Mapping_ENT may establish a mapping relationship between one LBA and one PBA. The map data receiver 210 may output the map data MAP_DATA received from the memory device 100 to the map data controller 230 and/or the buffer memory 220. Specifically, the map data receiver 210 may output the mapping entries Mapping_ENT included in the map data MAP_DATA to the map data controller 230 and/or the buffer memory 220.

The map data receiver 210 may receive map data MAP_DATA including a plurality of mapping entries with respect to the memory device 100 from the memory device 100 under the control of the processor 240. That is, when the processor 240 receives a request message REQ_MSG from the host 300, the processor 240 may control the map data receiver 210 to receive the map data MAP_DATA from the memory device 100.

The buffer memory 220 may receive map data MAP_DATA from the map data receiver 210 while the buffer memory 220 stores the map data MAP_DATA. Specifically, the buffer memory 220 may store map data MAP_DATA corresponding to the capacity of the buffer memory 220. That is, the buffer memory 220 may store mapping entries included in the map data MAP_DATA received from the map data receiver 210, a number of which corresponds to the capacity of the buffer memory 220.

Also, the buffer memory 220 may receive a requested logical block address REQ_LBA from the processor 240. The requested logical block address REQ_LBA may be provided along with the request message REQ_MSG from the host 300.

In an embodiment, when the mapping entries Mapping_ENT are stored in the buffer memory 220, the buffer memory 220 may search for a mapping entry Mapping_ENT having the requested logical block address REQ_LBA among the mapping entries Mapping_ENT included in the map data MAP_DATA. The buffer memory 220 may output the mapping entry Mapping_ENT having the requested logical block address REQ_LBA to the processor 240.

In an embodiment, the map data receiver 210 and the buffer memory 220 may be coupled through a channel. The map data receiver 210 may transmit the map data MAP_DATA to the buffer memory 220 through the channel. The map data controller 230 may receive the map data transmitted through the channel to detect a mapping entry corresponding to a request from the host 300.

The map data controller 230 may sequentially receive mapping entries Mapping_ENT included in map data MAP_DATA from the map data receiver 210. Also, the map data controller 230 may receive a requested logical block address REQ_LBA from the processor 240. The requested logical block address REQ_LBA may be provided along with the request message REQ_MSG from the host 300.

That is, the map data controller 230 may detect a mapping entry corresponding to the request message REQ_MSG among a plurality of mapping entries received from the map data receiver 210, based on the requested logical block address REQ_LBA. In addition, the map data controller 230 may output, to the processor 240, the mapping entry corresponding to the request message REQ_MSG received from the host 300 among the plurality of mapping entries received from the map data receiver 210.

Specifically, the map data controller 230 may determine whether mapping entry Mapping_ENT has the requested logical block address REQ_LBA. At least one requested logical block address REQ_LBA may be received from the processor 240.

The map data controller 230 may output the mapping entry Mapping_ENT to the processor 240, based on whether the mapping entry Mapping_ENT has the requested logical block address REQ_LBA.

Therefore, when the mapping entry Mapping_ENT includes the requested logical block address REQ_LBA, the map data controller 230 may output the mapping entry Mapping_ENT received from the map data receiver 210 to the processor 240.

The map data controller 230 may receive a plurality of requested logical block addresses REQ_LBAs from the processor 240. The map data controller 230 may determine whether a mapping entry received from the map data receiver 210 has any one among the plurality of requested logical block addresses REQ_LBAs. The map data controller 230 may output a mapping entry Mapping_ENT to the processor 240, based on whether the mapping entry Mapping ENT has any one among the plurality of requested logical block addresses REQ_LBAs. The map data controller 230 may output a mapping entry Mapping_ENT having any one of the plurality of requested logical block addresses REQ_LBAs to the processor 240. Subsequently, the map data controller 230 may receive target entries except the target entry corresponding to the mapping entry Mapping_ENT from the processor 240. The map data controller 230 may output a newly received mapping entry Mapping_ENT, based on whether the mapping entry Mapping_ENT corresponds to the received target entries. The requested logical block addresses REQ_LBA may be also referred to as a target entry.

The processor 240 may control overall operations of the memory controller 200, and perform a logical calculation. The processor 240 may communicate with an external host through a host interface, and communicate with the memory device 100 through a memory interface. The processor 240 may communicate with the map data controller 230 and/or the buffer memory 220.

The processor 240 may receive a request message REQ_MSG from the host 300. The processor 240 may output a requested logical block address REQ_LBA to the map data controller 230 and/or the buffer memory 220 to perform an operation corresponding to the request message REQ_MSG received from the host 300. The requested logical block address REQ_LBA may be provided in one or plurality. The processor 240 may receive a mapping entry Mapping_ENT having the requested logical block address REQ_LBA from the map data controller 230 and/or the buffer memory 220.

The processor 240 may receive a mapping entry Mapping_ENT from the map data controller 230 and/or the buffer memory 220, to output a PBA included in the mapping entry Mapping_ENT to the memory device 100. That is, the processor 240 may perform a function of the FTL. Therefore, the processor 240 may output, to the memory device 100, a PBA for performing an operation corresponding to the request message REQ_MSG received from the host 300.

The processor 240 may receive a mapping entry Mapping_ENT having the requested logical block address REQ_LBA from the map data controller 230 and/or the buffer memory 220. When the processor 240 receives the mapping entry Mapping_ENT having the requested logical block address REQ_LBA, the processor 240 may generate and output operation data OP_DATA for performing an operation corresponding to the request message REQ_MSG received from the host 300. The operation data OP_DATA may include a command for allowing an operation to be performed in the memory device, an address, and data. The memory device 100 may perform an operation corresponding to the request message REQ_MSG received from the host 300, based on the operation data OP_DATA.

The processor 240 randomizes data received from the host 300. For example, the processor 240 may randomize data received from the host 300 by using a randomizing seed. The randomized data is provided as data to be stored to the memory device 100 to be programmed in the memory cell array.

In a read operation, the processor 240 derandomizes data received from the memory device 100. For example, the processor 240 may derandomize data received from the memory device 100 by using a derandomizing seed. The derandomized data may be output to the host 300.

In an embodiment, the processor 240 may perform randomizing and derandomizing by driving software or firmware.

Figures 3, 4:
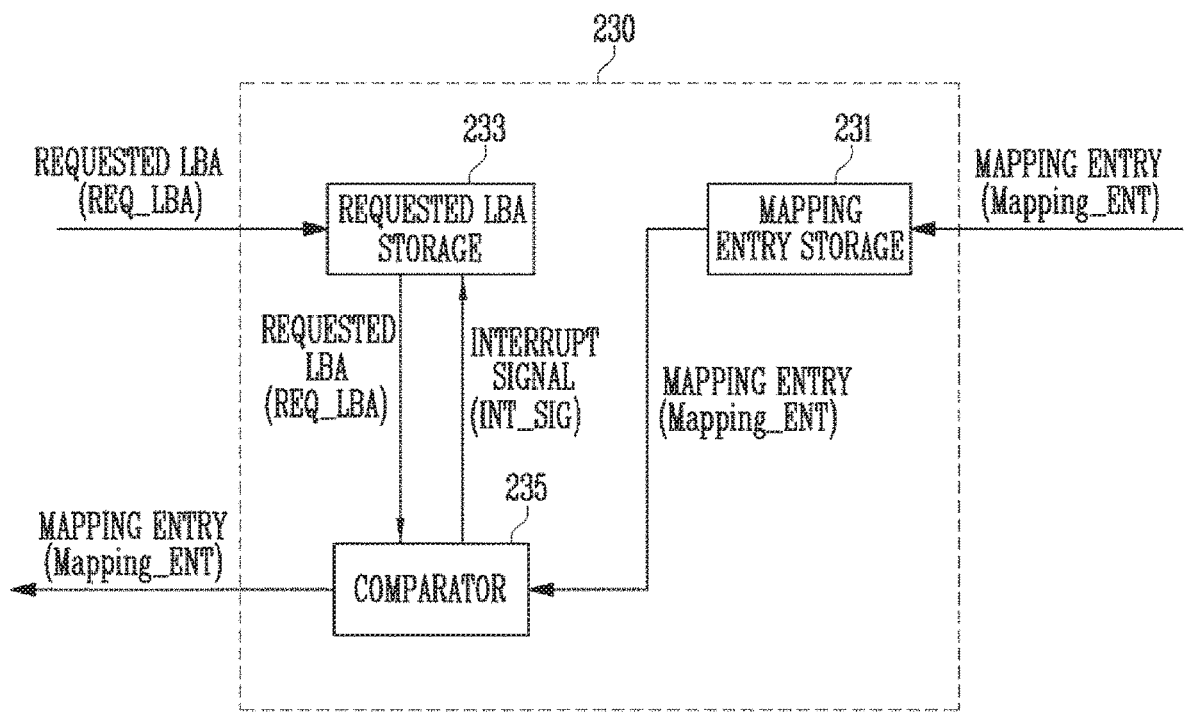
FIG. 3 is a diagram illustrating a configuration and an operation of a map data controller shown in FIG. 2.
FIG. 4 is a diagram illustrating a method for searching for a mapping entry.

FIG. 3 is a diagram illustrating a configuration and an operation of the map data controller shown in FIG. 2.

Referring to FIG. 3, the map data controller 230 may be configured with a mapping entry storage 231, a requested logical address storage 233, and a comparator 235. The mapping entry storage 231 may store a mapping entry Mapping_ENT received from the map data receiver 210. The requested logical address storage 233 may store a requested logical block address REQ_LBA received from the processor 240. The requested logical address storage 233 may be also referred to as the requested logical block address storage. The comparator 235 may compare the requested logical block address REQ_LBA received from the requested logical address storage 233 and the mapping entry Mapping_ENT received from the mapping entry storage 231.

The mapping entry Mapping_ENT may represent a mapping relationship between one LBA and one PBA.

The mapping entry Mapping_ENT may correspond to the requested logical block address REQ_LBA. Specifically, whether the mapping entry Mapping_ENT corresponds to the requested logical block address REQ_LBA may mean whether the mapping entry Mapping_ENT includes the requested logical block address REQ_LBA.

The mapping entry storage 231 may store a mapping entry Mapping_ENT received from the map data receiver 210. The mapping entry Mapping_ENT may be an entry included in map data MAP_DATA. The map data MAP_DATA may include a plurality of mapping entries Mapping_ENT. The mapping entry storage 231 may sequentially store the mapping entries Mapping_ENT included in the map data MAP_DATA. Consequently, the mapping entry storage 231 can store the plurality of mapping entries included in the map data MAP_DATA.

The mapping entry storage 231 may sequentially output the mapping entries Mapping_ENT stored therein one by one to the comparator 235. When the mapping entry storage 231 outputs a mapping entry Mapping_ENT, a next mapping entry Mapping_ENT included in the map data MAP_DATA may be stored in the mapping entry storage 231.

The requested logical address storage 233 may store a requested logical block address REQ_LBA received from the processor 240. The requested logical block address REQ_LBA may be provided along with the request message REQ_MSG from the host 300. The requested logical block address REQ_LBA may be provided in plurality.

The requested logical address storage 233 may store at least one requested logical block address REQ_LBA received from the processor 240. The requested logical address storage 233 may output the at least one requested logical block address REQ_LBA stored therein to the comparator 235. The at least one requested logical block address REQ_LBA output from the requested logical address storage 233 may be compared with a mapping entry Mapping_ENT output from the mapping entry storage 231.

In an embodiment, when the mapping entry Mapping_ENT corresponds to the at least one requested logical block address REQ_LBA output from the requested logical address storage 233, the requested logical address storage 233 may receive an interrupt signal INT_SIG. The requested logical address storage 233 may set a marking value of the requested logical block address REQ_LBA corresponding to the interrupt signal INT_SIG. When the requested logical address storage 233 receives the interrupt signal INT_SIG, the requested logical address storage 233 may determine a requested logical block address REQ_LBA to be output, based on the marking value of the requested logical block address REQ_LBA. That is, the requested logical address storage 233 may output, to the comparator 235, at least one requested logical block address REQ_LBA except the requested logical block address REQ_LBA corresponding to the mapping entry Mapping_ENT.

When all mapping entries Mapping_ENT received from the mapping entry storage 231 do not correspond to at least one requested logical block address REQ_LBA received from the processor 240, the requested logical address storage 233 may receive the interrupt signal INT_SIG. The interrupt signal INT_SIG may mean that there is no mapping entry Mapping_ENT corresponding to the at least one requested logical block address REQ_LBA.

The comparator 235 may receive a requested logical block address REQ_LBA from the requested logical address storage 233. Also, the comparator 235 may receive a mapping entry Mapping_ENT from the mapping entry storage 231. The comparator 235 may compare the requested logical block address REQ_LBA and the mapping entry Mapping_ENT. The comparator 235 may determine the output of the mapping entry Mapping_ENT and the output of an interrupt signal INT_SIG, based on whether mapping entry Mapping_ENT has the requested logical block address REQ_LBA.

Therefore, when the mapping entry Mapping_ENT corresponds to the requested logical block address REQ_LBA, the comparator 235 may output the mapping entry Mapping_ENT to the processor 240. Also, when the mapping entry Mapping_ENT corresponds to the requested logical block address REQ_LBA, the comparator 235 may output the interrupt signal INT_SIG to the requested logical address storage 233. Even when there is no mapping entry Mapping_ENT having the requested logical block address REQ_LBA, the comparator 235 may output the interrupt signal INT_SIG to the requested logical address storage 233.

The comparator 235 may receive a plurality of requested logical block addresses REQ_LBAs from the requested logical address storage 233. When a plurality of requested logical block addresses REQ_LBAs are provided along with the request message REQ_MSG, the comparator 235 may compare a mapping entry Mapping_ENT with the plurality of requested logical block addresses REQ_LBAs. That is, the comparator 235 may compare the mapping entry Mapping_ENT with any one of the plurality of requested logical block addresses REQ_LBAs received from the requested logical address storage 233. The comparator 235 may compare the mapping entry Mapping_ENT with all of the plurality of requested logical block addresses REQ_LBAs, and then receive a new mapping entry Mapping_ENT from the mapping entry storage 231.

When the mapping entry Mapping_ENT corresponds to any one of the plurality of requested logical block addresses REQ_LBAs received from the requested logical address storage 233, the comparator 235 may output the mapping entry Mapping_ENT to the processor 240. That is, the comparator 235 may output a mapping entry corresponding to a requested logical block address REQ_LBA among a plurality of mapping entries received from the mapping entry storage 231 as a mapping entry corresponding to a request from the host.

Also, the comparator 235 may output an interrupt signal INT_SIG to the requested logical address storage 233. The interrupt signal INT_SIG may represent that a mapping entry Mapping_ENT having a corresponding requested logical block address REQ_LBA has been output. The requested logical address storage 233 may output a requested logical block address REQ_LBA corresponding to the mapping entry Mapping_ENT by receiving the interrupt signal INT_SIG.

After the comparator 235 outputs a mapping entry Mapping_ENT to the processor 240, the comparator 235 may receive requested logical block addresses REQ_LBAs except a requested logical block address REQ_LBA corresponding to the mapping entry Mapping_ENT from the requested logical address storage 233. Also, the comparator 235 may receive a next mapping entry Mapping_ENT stored in the mapping entry storage 231. The comparator 235 may receive next mapping entries Mapping_ENT from the map data receiver 210 until a plurality of requested logical block addresses REQ_LBAs correspond to all mapping entries Mapping_ENT input to the comparator 235.

The comparator 235 may compare a next mapping entry Mapping_ENT received from the mapping entry storage 231 with requested logical block addresses REQ_LBAs received from the requested logical address storage 233. The comparator 235 may receive requested logical block addresses REQ_LBAs from the requested logical address storage 233 until all the requested logical block addresses REQ_LBAs correspond to the mapping entry Mapping_ENT. Alternatively, the comparator 235 may receive requested logical block addresses REQ_LBAs from the requested logical address storage 233 until the comparator 235 compares the requested logical block address REQ_LBA stored in the requested logical address storage 233 with the last mapping entry Mapping_ENT included in the last map data stored in the mapping entry storage 231.

Even when there is no mapping entry Mapping_ENT corresponding to requested logical block addresses REQ_LBAs, the comparator 235 may output an interrupt signal INT_SIG to the processor 240. That is, when any one of requested logical block addresses REQ_LBAs stored in the requested logical address storage 233 does not correspond to all mapping entries Mapping_ENT stored in the mapping entry storage 231, the comparator 235 may represent that there is no corresponding mapping entry Mapping_ENT through the interrupt signal INT_SIG.

When a plurality of requested logical block addresses REQ_LBAs are provided, the comparator 235 may store a mapping entry Mapping_ENT corresponding to any one of the plurality of requested logical block addresses REQ_LBAs. That is, when a mapping entry Mapping_ENT corresponds to any one of the plurality of requested logical block addresses REQ_LBAs, the comparator 235 may not immediately output the mapping entry Mapping_ENT. Therefore, the comparator 235 may store the mapping entry Mapping_ENT therein and then output the mapping entry Mapping_ENT to the processor 240.

Consequently, when mapping entries Mapping_ENT corresponding to the plurality of requested logical block addresses REQ_LBAs are all stored in the comparator 235, the comparator 235 may output at least one of the mapping entries Mapping_ENT stored in the comparator 235 to the processor 240.

When a plurality of consecutive requested logical block addresses REQ_LBAs are provided, the comparator 235 may output a mapping entry Mapping_ENT corresponding to a first requested logical block address REQ_LBA among the consecutive requested logical block addresses REQ_LBAs. A number of consecutive target entries, i.e., a consecutive value may be recorded for the first requested logical block address REQ_LBA.

In an embodiment, when the comparator 235 outputs a mapping entry Mapping_ENT corresponding to the first requested logical block address REQ_LBA, the comparator 235 may output as many mapping entries Mapping_ENT as the consecutive value recorded for the first requested logical block address REQ_LBA. That is, after the comparator 235 outputs a mapping entry Mapping_ENT, the comparator 235 may output as many consecutive mapping entries Mapping_ENT as the number of consecutive requested logical block addresses REQ_LBAs. Thus, a mapping entry Mapping_ENT can be output without determining whether the mapping entries Mapping_ENT include the consecutive requested logical block addresses REQ_LBAs.

FIG. 4 is a diagram illustrating a method for searching for a mapping entry.

Referring to FIG. 4, first map data MAP_DATA1 among map data MAP_DATA that the map data receiver 210 receives from the memory device 100 is illustrated in FIG. 4. The map data MAP_DATA may include one, two, or more mapping entries Mapping_ENT. The mapping entry Mapping_ENT may establish a mapping relationship between one LBA and one PBA.

In FIG. 4, a case where the first map data MAP_DATA1 includes eleventh to fourteenth mapping entries Mapping_ENT11 to Mapping_ENT14 is illustrated. Also, a case where one requested logical block address REQ_LBA is received from the processor 240 is illustrated. Also, a case where the requested logical block address REQ_LBA received from the processor 240 includes a third LBA LBA3 is illustrated.

The first map data MAP_DATA1 may include the eleventh to fourteenth mapping entries Mapping_ENT11 to 14. Each of the four mapping entries Mapping_ENT may establish a mapping relationship between an LBA and a PBA. That is, the eleventh mapping entry Mapping_ENT11 may establish a mapping relationship between a first LBA LBA1 and a first PBA PBA1. The twelfth mapping entry Mapping_ENT12 may establish a mapping relationship between a second LBA LBA2 and a second PBA PBA2. The thirteenth mapping entry Mapping_ENT13 may establish a mapping relationship between the third LBA LBA3 and a third PBA PBA3. The fourteenth mapping entry Mapping_ENT14 may establish a mapping relationship between a fourth LBA LBA4 and a fourth PBA PBA4.

The mapping entry storage 231 may sequentially receive mapping entries Mapping_ENT included in the map data MAP_DATA from the map data receiver 210 and store the mapping entries Mapping_ENT. Therefore, the mapping entry storage 231 may sequentially receive the mapping entries Mapping_ENT from the eleventh mapping entry Mapping_ENT11 to the fourteenth mapping entry Mapping_ENT14, which are included in the first map data MAP_DATA1. The mapping entry storage 231 may store the sequentially received mapping entries Mapping_ENT11 to 14.

The requested logical address storage 233 may receive a requested logical block address REQ_LBA from the processor 240. The requested logical block address REQ_LBA may be provided along with the request message REQ_MSG from the host 300. One, two, or more requested logical block addresses REQ_LBAs may be received from the processor 240. The requested logical address storage 233 may store the received requested logical block address REQ_LBA.

In FIG. 4, a case where the requested logical block address REQ_LBA received from the processor 240 includes the third LAB LAB3 is illustrated.

The comparator 235 may compare a requested logical block address REQ_LBA received from the requested logical address storage 233 and a mapping entry Mapping_ENT received from the mapping entry storage 231. That is, the comparator 235 may compare a requested logical block address REQ_LBA and an LBA included in the mapping entry Mapping_ENT. Therefore, since the eleventh mapping entry Mapping_ENT11 establishes the mapping relationship between the first LBA LBA1 and the first PBA PBA1, the requested logical block address REQ_LBA and the eleventh mapping entry Mapping_ENT11 may not correspond to each other.

After the comparator 235 compares the requested logical block address REQ_LBA and the eleventh mapping entry Mapping_ENT11, the comparator 235 may receive the twelfth mapping entry Mapping_ENT12 from the mapping entry storage 231. After the comparator 235 receives the twelfth mapping entry Mapping_ENT12, the comparator 235 may compare the requested logical block address REQ_LBA and the twelfth mapping entry Mapping_ENT12. That is, the comparator 235 may compare the third LBA LBA3 included in the requested logical block address REQ_LBA and the second LBA LBA2 included in the twelfth mapping entry Mapping_ENT12.

The third LBA LBA3 included in the requested logical block address REQ_LBA and the second LBA LBA2 included in the twelfth mapping entry Mapping_ENT12 may be different from each other. Therefore, after the comparator 235 compares the requested logical block address REQ_LBA and the twelfth mapping entry Mapping_ENT12, the comparator 235 may receive the thirteenth mapping entry Mapping_ENT13. The comparator 235 may compare the requested logical block address REQ_LBA and the thirteenth mapping entry Mapping_ENT13. That is, the comparator 235 may compare the third LBA LBA3 included in the requested logical block address REQ_LBA and the third LBA LBA3 included in the thirteenth mapping entry Mapping_ENT13.

Since the third LBA LBA3 is included in the thirteenth mapping entry Mapping_ENT13, the comparator 235 may output the thirteenth mapping entry Mapping_ENT13 to the processor 240. That is, the requested logical block address REQ_LBA and the thirteenth mapping entry Mapping_ENT13 may correspond to each other. Therefore, the comparator 235 may output the thirteenth mapping entry Mapping_ENT13 corresponding to the requested logical block address REQ_LBA to the processor 240.

Also, the comparator 235 may generate and output an interrupt signal INT_SIG to represent that the thirteenth mapping entry Mapping_ENT13 corresponding to the requested logical block address REQ_LBA has been output.

Since one requested logical block address REQ_LBA is provided, the map data controller 230 may no longer receive any mapping entry Mapping_ENT from the map data receiver 210. Therefore, an operation of the map data controller 230 may be completed without receiving the fourteenth mapping entry Mapping_ENT14.

FIG. 5 is a diagram illustrating a method for outputting a plurality of target entries from the requested logical address storage.

Referring to FIG. 5, the requested logical address storage 233 may store first to third requested logical block addresses REQ_LBA1 to REQ_LBA3 and corresponding marking values. Each marking value may represent whether a mapping entry Mapping_ENT having a corresponding requested logical block address REQ_LBA is to be output. The requested logical block address REQ_LBA may be provided along with the request message REQ_MSG from the host 300. The requested logical block address REQ_LBA may be provided in plurality. Therefore, the plurality of requested logical block addresses REQ_LBAs may be stored in the requested logical address storage 233.

In FIG. 5, a case where marking value "0" represents that a mapping entry Mapping_ENT having a corresponding requested logical block address REQ_LBA has not been output is illustrated. Also, a case where marking value "1" represents that the mapping entry Mapping_ENT having the corresponding requested logical block address REQ_LBA has been output is illustrated. In another embodiment, the marking value "0" may represent that a mapping entry Mapping_ENT having a corresponding requested logical block address REQ_LBA has been output. Also, the marking value "1" may represent that the mapping entry Mapping_ENT having the corresponding requested logical block address REQ_LBA has not been output.

The requested logical address storage 233 may store a plurality of requested logical block addresses REQ_LBAs received from the processor 240. The requested logical block addresses REQ_LBAs may be provided along with the request message REQ_MSG from the host 300.

In an embodiment, the requested logical address storage 233 may store the first to third requested logical block addresses REQ_LBA1 to REQ_LBA3 received from the processor 240. The requested logical address storage 233 may output the first to third requested logical block addresses REQ_LBA1 to REQ_LBA3 stored therein to the comparator 235. The requested logical address storage 233 may output the first to third requested logical block addresses REQ_LBA1 to REQ_LBA3, based on marking values corresponding thereto.

A marking value column of S501 may represent a marking value when requested logical block addresses REQ_LBAs are received from the processor 240. That is, the marking value column of S501 may represent a marking value when a mapping entry Mapping_ENT corresponding to the first to third requested logical block addresses REQ_LBA1 to REQ_LBA3 is not yet output. Therefore, when comparison between the first to third requested logical block addresses REQ_LBA1 to REQ_LBA3 and the mapping entry Mapping_ENT is ended, the requested logical address storage 233 may re-output the first to third requested logical block addresses REQ_LBA1 to REQ_LBA3 of the marking value "0" to the comparator 235.

When the first to third requested logical block addresses REQ_LBA1 to REQ_LBA3 are output to the comparator 235, the comparator 235 may compare the first to third requested logical block addresses REQ_LBA1 to REQ_LBA3 and a mapping entry Mapping_ENT received from the mapping entry storage 231. That is, each of the first to third requested logical block addresses REQ_LBA1 to REQ_LBA3 and an LBA included in the mapping entry Mapping_ENT may be compared with each other.

When the mapping entry Mapping_ENT received from the mapping entry storage 231 does not correspond to the first to third requested logical block addresses REQ_LBA1 to REQ_LBA3, the first to third requested logical block addresses REQ_LBA1 to REQ_LBA3 may be compared with a next received mapping entry Mapping_ENT.

When the mapping entry Mapping_ENT corresponds to any one of the first to third requested logical block addresses REQ_LBA1 to REQ_LBA3, the requested logical address storage 233 may receive an interrupt signal INT_SIG from the comparator 235. The requested logical address storage 233 may set a marking value of a requested logical block address REQ_LBA corresponding to the interrupt signal INT_SIG. Therefore, when the first requested logical block address REQ_LBA1 and an LBA included in the mapping entry Mapping_ENT correspond to each other, the requested logical address storage 233 may change the marking value of the first requested logical block address REQ_LBA1 from "0" to "1," based on the interrupt signal INT_SIG.

When the requested logical address storage 233 receives the interrupt signal INT_SIG, the requested logical address storage 233 may determine the requested logical block addresses REQ_LBA2 and REQ_LBA3 to be output, based on a marking value of the requested logical block address REQ_LBA. That is, the requested logical address storage 233 may output requested logical block addresses REQ_LBAs of which a marking value is "0."

Therefore, the requested logical address storage 233 may output, to the comparator 235, the second and third requested logical block addresses REQ_LBA2 and REQ_LBA3 except the first requested logical block address REQ_LBA1 corresponding to the mapping entry Mapping_ENT. When the second and third requested logical block addresses REQ_LBA2 and REQ_LBA3 are output to the comparator 235, the comparator 235 may compare a next received mapping entry Mapping_ENT and the second and third requested logical block addresses REQ_LBA2 and REQ_LBA3. The comparator 235 may determine whether a mapping entry Mapping_ENT or an interrupt signal INT_SIG is to be output, based on the comparison result between the next received mapping entry Mapping_ENT and the second and third requested logical block addresses REQ_LBA2 and REQ_LBA3.

The comparator 235 may receive next mapping entries Mapping_ENT from the map data receiver 210 until the first to third requested logical block addresses REQ_LBA1 to REQ_LBA3 correspond to respective mapping entries Mapping_ENT input to the comparator 235.

FIG. 6 is a diagram illustrating a method for outputting mapping entries corresponding to the requested logical block addresses shown in FIG. 5 when the target requested logical block addresses are output.

Referring to FIGS. 5 and 6, a case where the requested logical address storage 233 stores the first to third requested logical block addresses REQ_LBA1 to REQ_LBA3 is illustrated. A case where the first requested logical block address REQ_LBA1 is a third LBA LBA3, the second requested logical block address REQ_LBA2 is a fifth LBA LBA5, and the third requested logical block address REQ_LBA3 is a ninth LBA LBA9 is illustrated.

The map data receiver 210 may receive a map data MAP_DATA from the memory device 100. In an embodiment, the map data receiver 210 may receive first to third map data MAP_DATA1 to 3 from the memory device 100. The first map data MAP_DATA1 may include eleventh to fourteenth mapping entries Mapping_ENT11 to 14. The second map data MAP_DATA2 may include twenty-first to twenty-fourth mapping entries Mapping_ENT21 to 24. The third map data MAP_DATA3 may include thirty-first to thirty-fourth mapping entries Mapping_ENT31 to 34.

The map data receiver 210 may output mapping entries included in the map data MAP_DATA to the map data controller 230. That is, the map entry storage 231 may sequentially receive the eleventh to thirty-fourth mapping entries Mapping_ENT11 to 34 included in the first to third map data MAP_DATA1 to 3 from the map data receiver 210. The comparator 235 may sequentially receive the mapping entries Mapping_ENT stored in the mapping entry storage 231. That is, when comparison between requested logical block addresses REQ_LBAs received by the comparator 235 and a mapping entry Mapping_ENT is ended, the comparator 235 may receive a next mapping entry Mapping_ENT stored in the mapping entry storage 231.

The comparator 235 may receive the first to third requested logical block addresses REQ_LBA1 to REQ_LBA3 and the eleventh mapping entry Mapping_ENT11 included in the first map data MAP_DATA1. Therefore, the comparator 235 may compare the first to third requested logical block addresses REQ_LBA1 to REQ_LBA3 and the eleventh mapping entry Mapping_ENT11.

Specifically, the comparator 235 may determine whether the logical block addresses LBA3, LBA5, and LBA9 (i.e., the first to third requested logical block addresses REQ_LBA1 to REQ_LBA3) correspond to a first LBA LBA1 included in the eleventh mapping entry Mapping_ENT11. When the logical block addresses LBA3, LBA5, and LBA9 (i.e., the first to third requested logical block addresses REQ_LBA1 to REQ_LBA3) do not correspond to the first LBA LBA1 included in the eleventh mapping entry Mapping_ENT11, the eleventh mapping entry Mapping_ENT11 and an interrupt signal INT_SIG may not be output. Therefore, the marking value of the first to third requested logical block addresses REQ_LBA1 to REQ_LBA3 may be maintained as "0."

Subsequently, the comparator 235 may receive the first to third requested logical block addresses REQ_LBA1 to REQ_LBA3 and the twelfth mapping entry Mapping_ENT12 included in the first map data MAP_DATA1. Therefore, the comparator 235 may compare the first to third requested logical block addresses REQ_LBA1 to REQ_LBA3 and the twelfth mapping entry Mapping_ENT12. Specifically, the comparator 235 may determine whether the logical block addresses LBA3, LBA5, and LBA9 (i.e., the first to third requested logical block addresses REQ_LBA1 to REQ_LBA3) correspond to a second LBA LBA2 included in the twelfth mapping entry Mapping_ENT12. When the logical block addresses LBA3, LBA5, and LBA9 (i.e., the first to third requested logical block addresses REQ_LBA1 to REQ_LBA3) do not correspond to the second LBA LBA2 included in the twelfth mapping entry Mapping_ENT12, the twelfth mapping entry Mapping_ENT12 and an interrupt signal INT_SIG may not be output. Therefore, the marking value of the first to third requested logical block addresses REQ_LBA1 to REQ_LBA3 may be maintained as "0."

Subsequently, the comparator 235 may receive the first to third requested logical block addresses REQ_LBA1 to REQ_LBA3 and the thirteenth mapping entry Mapping_ENT13 included in the first map data MAP_DATA1. Therefore, the comparator 235 may compare the first to third requested logical block addresses REQ_LBA1 to REQ_LBA3 and the thirteenth mapping entry Mapping_ENT13. Specifically, the comparator 235 may determine whether the logical block addresses LBA3, LBA5, and LBA9 (i.e., the first to third requested logical block addresses REQ_LBA1 to REQ_LBA3) correspond to a third LBA LBA3 included in the thirteenth mapping entry Mapping_ENT13.

In an embodiment, since the first requested logical block address REQ_LBA1 is the third LBA LBA3, the first requested logical block address REQ_LBA1 and the LBA included in the thirteenth mapping entry Mapping_ENT13 may be the same. Therefore, the comparator 235 may output the thirteenth mapping entry Mapping_ENT13 to the processor 240. Also, the comparator 235 may output an interrupt signal INT_SIG representing that the thirteenth mapping entry Mapping_ENT13 including the third LBA LBA3 (i.e., the first requested logical block address REQ_LBA1) has been output.

The requested logical address storage 233 may receive an interrupt signal INT_SIG from the comparator 235. The requested logical address storage 233 may change the marking value of the first requested logical block address REQ_LBA1 from "0" to "1," based on the interrupt signal INT_SIG.

Subsequently, since the thirteenth mapping entry Mapping_ENT13 including the third LBA LBA3 (i.e., the first requested logical block address REQ_LBA1) has been output, the requested logical address storage 233 may output the second and the third requested logical block addresses REQ_LBA2 and REQ_LBA3 except the first requested logical block address REQ_LBA1 to the comparator 235. In addition, the mapping entry storage 231 may output the fourteenth mapping entry Mapping_ENT14 as a next mapping entry to the comparator 235. The comparator 235 may compare the second and third requested logical block addresses REQ_LBA2 and REQ_LBA3 and the fourteenth mapping entry Mapping_ENT14.

Specifically, the comparator 235 may determine whether the logical block addresses LBA5 and LBA9 (i.e., the second and third requested logical block addresses REQ_LBA2 and REQ_LBA3) correspond to a fourth LBA LBA4 included in the fourteenth mapping entry Mapping_ENT14. When the logical block addresses LBA5 and LBA9 (i.e., the second and third requested logical block addresses REQ_LBA2 and REQ_LBA3) do not correspond to the fourth LBA LBA4 included in the fourteenth mapping entry Mapping_ENT14, the fourteenth mapping entry Mapping_ENT14 and an interrupt signal INT_SIG may not be output. Therefore, the marking value of the second and third requested logical block addresses REQ_LBA2 and REQ_LBA3 may be maintained as "0."

Subsequently, the comparator 235 may receive the second and third requested logical block addresses REQ_LBA2 and REQ_LBA3 and the twenty-first mapping entry Mapping_ENT21 included in the second map data MAP_DATA2. Therefore, the comparator 235 may compare the second and third requested logical block addresses REQ_LBA2 and REQ_LBA3 and the twenty-first mapping entry Mapping_ENT21. Specifically, the comparator 235 may determine whether the logical block addresses LBA5 and LBA9 (i.e., the second and third requested logical block addresses REQ_LBA2 and REQ_LBA3) correspond to the fifth LBA LBA5 included in the twenty-first mapping entry Mapping_ENT21.

In an embodiment, since the second requested logical block address REQ_LBA2 is the fifth logical block address LBA5, the second requested logical block address REQ_LBA2 and the LBA included in the twenty-first mapping entry Mapping_ENT21 may be the same. Therefore, the comparator 235 may output the twenty-first mapping entry Mapping_ENT21 to the processor 240. Also, the comparator 235 may output an interrupt signal INT_SIG representing that the twenty-first mapping entry Mapping_ENT21 including the second requested logical block address REQ_LBA2 has been output.

The requested logical address storage 233 may receive an interrupt signal INT_SIG from the comparator 235. The requested logical address storage 233 may change the marking value of the second requested logical block address REQ_LBA2 from "0" to "1," based on the interrupt signal INT_SIG.

Subsequently, since the thirteenth and twenty-first mapping entries Mapping_ENT13 and Mapping_ENT21 including the first and second requested logical block addresses REQ_LBA1 and REQ_LBA2 have been output, the requested logical address storage 233 may output the third requested logical block address REQ_LBA3 except the first and second requested logical block addresses REQ_LBA1 and REQ_LBA2 to the comparator 235. In addition, the mapping entry storage 231 may output the twenty-second mapping entry Mapping_ENT22 as a next mapping entry to the comparator 235. The comparator 235 may compare the third requested logical block address REQ_LBA3 and the twenty-second mapping entry Mapping_ENT22. Specifically, the comparator 235 may determine whether the third requested logical block address REQ_LBA3 corresponds to an LBA included in the twenty-second mapping entry Mapping_ENT22. When the third requested logical block address REQ_LBA3 does not correspond to the LBA included in the twenty-second mapping entry Mapping_ENT22, the twenty-second mapping entry Mapping_ENT22 and an interrupt signal INT_SIG may not be output. Therefore, the marking value of the third requested logical block address REQ_LBA3 may be maintained as "0."

In the manner described above, the mapping entry storage 231 may output the twenty-third and twenty-fourth mapping entries Mapping_ENT23 and Mapping_ENT24 included in the second map data MAP_DAT2 to the comparator 235. The requested logical address storage 233 may output the third requested logical block address REQ_LBA3. The comparator 235 may compare the third requested logical block address REQ_LBA3 and the twenty-third and twenty-fourth mapping entries Mapping_ENT23 and Mapping_ENT24 sequentially received from the mapping entry storage 231.

After the comparator 235 compares the third requested logical block address REQ_LBA3 and the twenty-third and twenty-fourth mapping entries Mapping_ENT23 and Mapping_ENT24, the comparator 235 may receive the third requested logical block address REQ_LBA3 and the thirty-first mapping entry Mapping_ENT31. Therefore, the comparator 235 may compare the third requested logical block address REQ_LBA3 and the thirty-first mapping entry Mapping_ENT31. Specifically, the comparator 235 may determine whether the third requested logical block address REQ_LBA3 corresponds to an LBA included in the thirty-first mapping entry Mapping_ENT31.

In an embodiment, since the third requested logical block address REQ_LBA3 is the ninth logical block address LBA9, the third requested logical block address REQ_LBA3 and the LBA included in the thirty-first mapping entry Mapping_ENT31 may be the same. Therefore, the comparator 235 may output the thirty-first mapping entry Mapping_ENT31 to the processor 240. Also, the comparator 235 may output an interrupt signal INT_SIG representing that the thirty-first mapping entry Mapping_ENT31 including the third requested logical block address REQ_LBA3 has been output.

The requested logical address storage 233 may receive an interrupt signal INT_SIG from the comparator 235. The requested logical address storage 233 may change the marking value of the third requested logical block address REQ_LBA3 from "0" to "1," based on the interrupt signal INT_SIG.

Since all the marking values of the first to third requested logical block addresses REQ_LBA1 to REQ_LBA3 stored in the requested logical address storage 233 are "1," the requested logical address storage 233 may no longer output any requested logical block address REQ_LBA. In addition, the mapping entry storage 231 may no longer output any mapping entry Mapping_ENT. Therefore, the thirty-second to thirty-fourth mapping entries Mapping_ENT32 to 34 included in the third map data MAP_DATA3 may not be output to the comparator 235.

FIG. 7 is a diagram illustrating a method for displaying consecutive target entries, when a plurality of target entries are consecutive.

Referring to FIG. 7, the requested logical address storage 233 may store first to third requested logical block addresses REQ_LBA1 to REQ_LBA3. When the first to third requested logical block addresses REQ_LBA1 to REQ_LBA3 are consecutive, the requested logical address storage 233 may correspond the first requested logical block address REQ_LBA among the consecutive requested logical block addresses REQ_LBA1 to REQ_LBA3 to a consecutive value. The consecutive value may represent a number of the consecutive requested logical block addresses REQ_LBAs.

In FIG. 7, a case where the first to third requested logical block addresses REQ_LBA1 to REQ_LBA3 are consecutive is illustrated. That is, the three requested logical block addresses REQ_LBA1 to REQ_LBA3 may be consecutive. A case where the first requested logical block address REQ_LBA1 among the consecutive requested logical block addresses REQ_LBA1 to REQ_LBA3 is a starting LBA of the requested LBAs is assumed. Therefore, the first requested logical block address REQ_LBA1 may correspond to "3" as the consecutive value.

The requested logical block address REQ_LBA may be provided along with the request message REQ_MSG from the host 300. The requested logical block address REQ_LBA may be provided in plurality. Therefore, the plurality of requested logical block addresses REQ_LBAs may be stored in the requested logical address storage 233.

The requested logical address storage 233 may store a plurality of requested logical block addresses REQ_LBA1 to REQ_LBA3 received from the processor 240. The requested logical block addresses REQ_LBA1 to REQ_LBA3 may be provided along with the request message REQ_MSG from the host 300.

In an embodiment, the requested logical address storage 233 may store first to third requested logical block addresses REQ_LBA1 to REQ_LBA3 received from the processor 240. The requested logical address storage 233 may output the first to third requested logical block addresses REQ_LBA1 to REQ_LBA3 stored therein to the comparator 235.

When the first to third requested logical block addresses REQ_LBA1 to REQ_LBA3 are output to the comparator 235, the comparator 235 may compare the first requested logical block address REQ_LBA1 with the logical block address LBA included in a mapping entry Mapping_ENT received from the mapping entry storage 231. That is, the comparator 235 may compare the first requested logical block address REQ_LBA1 and an LBA included in the mapping entry Mapping_ENT. Since the first to third requested logical block addresses REQ_LBA1 to REQ_LBA3 are consecutive, the comparator 235 may compare only the first requested logical block address REQ_LBA1 with the LBA included in the mapping entry Mapping_ENT.

When the mapping entry Mapping_ENT received from the mapping entry storage 231 does not correspond to the first requested logical block address REQ_LBA1, the first requested logical block address REQ_LBA1 may be compared with a next received mapping entry Mapping_ENT.

When the mapping entry Mapping_ENT corresponds to the first requested logical block address REQ_LBA1, the comparator 235 may output the corresponding mapping entry Mapping_ENT to the processor 240. Since the first to third requested logical block addresses REQ_LBA1 to REQ_LBA3 are consecutive, the requested logical address storage 231 may not output the second and third requested logical block addresses REQ_LBA2 and REQ_LBA3 to the comparator 235, after the comparator 235 outputs the corresponding mapping entry Mapping_ENT to the processor 240. The comparator 235 does not compare the second and third requested logical block addresses REQ_LBA2 and REQ_LBA3 and the mapping entry Mapping_ENT, but may output the mapping entry Mapping_ENT to the processor 240.

Specifically, the comparator 235 may output mapping entries Mapping_ENT input after the comparator 235 outputs the corresponding mapping entry Mapping_ENT to the processor 240. That is, the comparator 235 may output as many mapping entries Mapping_ENT as the consecutive value of the first requested logical block address REQ_LBA1. The comparator 235 may check the consecutive value of the first requested logical block address REQ_LBA1. Therefore, the comparator 235 may output as many mapping entries Mapping_ENT as the consecutive value of the first requested logical block address REQ_LBA1. That is, after the comparator 235 outputs a mapping entry Mapping_ENT corresponding to the first requested logical block address REQ_LBA1, the comparator 235 may output two consecutively input mapping entries Mapping_ENT. The two mapping entries Mapping_ENT may be output without being compared with the second and third requested logical block addresses REQ_LBA2 and REQ_LBA3.

FIG. 8 is a diagram illustrating a method for outputting mapping entries from the mapping entry storage, when the target entries shown in FIG. 7 are consecutive.

Referring to FIGS. 7 and 8, a case where the requested logical address storage 233 stores the first to third requested logical block addresses REQ_LBA1 to REQ_LBA3 is illustrated. A case where the first to third requested logical block addresses REQ_LBA1 to REQ_LBA3 are consecutive is illustrated. That is, a case where the first requested logical block address REQ_LBA1 is a third logical block address LBA3, the second requested logical block address REQ_LBA2 is a fourth logical block address LBA4, and the third requested logical block address REQ_LBA3 is a fifth logical block address LBA5 is illustrated. Also, a case where the first requested logical block address REQ_LBA1 corresponds to "3" as the consecutive value is illustrated.

The map data receiver 210 may receive a map data MAP_DATA from the memory device 100. In an embodiment, the map data receiver 210 may receive first and second map data MAP_DATA1 and MAP_DATA2 from the memory device 100. The first map data MAP_DATA1 may include eleventh to fourteenth mapping entries Mapping_ENT11 to 14. The second map data MAP_DATA2 may include twenty-first to twenty-fourth mapping entries Mapping_ENT21 to 24.

The map data receiver 210 may output mapping entries Mapping_ENT included in the MAP_DATA to the map data controller 230. That is, the mapping entry storage 231 may sequentially receive the eleventh to twenty-fourth mapping entries Mapping_ENT11 to 24 included in the first and second map data MAP_DATA1 and MAP_DATA2 from the map data receiver 210. The comparator 235 may sequentially receive the mapping entries Mapping_ENT stored in the mapping entry storage 231. That is, when comparison between requested logical block addresses REQ_LBAs received by the comparator 235 and a mapping entry Mapping_ENT is ended, the comparator 235 may receive a next mapping entry Mapping_ENT stored in the mapping entry storage 231.

The comparator 235 may receive the first to third requested logical block addresses REQ_LBA1 to REQ_LBA3 and the eleventh mapping entry Mapping_ENT11 included in the first map data MAP_DATA1. Therefore, the comparator 235 may compare the first to third requested logical block addresses REQ_LBA1 to REQ_LBA3 and the eleventh mapping entry Mapping_ENT11. However, since the first to third requested logical block addresses REQ_LBA1 to REQ_LBA3 are consecutive, and the first requested logical block address REQ_LBA1 is a starting LBA of the requested LBAs, the comparator 235 may compare only the first requested logical block address REQ_LBA1 with the eleventh mapping entry Mapping_ENT11.

Specifically, the comparator 235 may determine whether the third LBA LBA3 (i.e., the first requested logical block address REQ_LBA1) corresponds to a first LBA LBA1 included in the eleventh mapping entry Mapping_ENT11. When the third LBA LBA3 (i.e., the first requested logical block address REQ_LBA1) does not correspond to the first LBA LBA1 included in the eleventh mapping entry Mapping_ENT11, the eleventh mapping entry Mapping_ENT11 and an interrupt signal INT_SIG may not be output.

Subsequently, the comparator 235 may receive the first to third requested logical block addresses REQ_LBA1 to REQ_LBA3 and the twelfth mapping entry Mapping_ENT12 included in the first map data MAP_DATA1. Therefore, the comparator 235 may compare the first requested logical block address REQ_LBA1 and the twelfth mapping entry Mapping_ENT12.

Specifically, the comparator 235 may determine whether the third LBA LBA3 (i.e., the first requested logical block address REQ_LBA1) corresponds to a second LBA LBA2 included in the twelfth mapping entry Mapping_ENT12. When the third LBA LBA3 (i.e., the first requested logical block address REQ_LBA1) does not correspond to the second LBA LBA2 included in the twelfth mapping entry Mapping_ENT12, the twelfth mapping entry Mapping_ENT12 and an interrupt signal INT_SIG may not be output.

Subsequently, the comparator 235 may receive the first to third requested logical block addresses REQ_LBA1 to REQ_LBA3 and the thirteenth mapping entry Mapping_ENT13 included in the first map data MAP_DATA1. Therefore, the comparator 235 may compare the first requested logical block address REQ_LBA1 and the thirteenth mapping entry Mapping_ENT13. Specifically, the comparator 235 may determine whether the third LBA LBA3 (i.e., the first requested logical block address REQ_LBA1) corresponds to an LBA included in the thirteenth mapping entry Mapping_ENT13.

In an embodiment, since the first requested logical block address REQ_LBA1 is the third LBA LBA3, the third LBA LBA3 (i.e., the first requested logical block address REQ_LBA1) and the LBA included in the thirteenth mapping entry Mapping_ENT13 may be the same. Therefore, the comparator 235 may output the thirteenth mapping entry Mapping_ENT13 to the processor 240. Also, the comparator 235 may output an interrupt signal INT_SIG representing that the thirteenth mapping entry Mapping_ENT13 including the third LBA LBA3 (i.e., the first requested logical block address REQ_LBA1) has been output.

Since the first to third requested logical block addresses REQ_LBA1 to REQ_LBA3 are consecutive, the requested logical address storage 231 may not output the second and third requested logical block addresses REQ_LBA2 and REQ_LBA3 to the comparator 235, after the comparator 235 outputs the thirteenth mapping entry Mapping_ENT13 to the processor 240. The comparator 235 may output a mapping entry Mapping_ENT to the processor 240 without comparing the second and third requested logical block addresses REQ_LBA2 and REQ_LBA3 and the mapping entry Mapping_ENT.

Specifically, the comparator 235 may output fourteenth and fifteenth mapping entries Mapping_ENT14 and Mapping_ENT15 input after the comparator 235 outputs the thirteenth mapping entry Mapping_ENT13 to the processor 240. That is, the comparator may output the thirteenth to fifteenth mapping entries Mapping_ENT13 to 15 so as to output as many mapping entries Mapping_ENT as the consecutive value of the first requested logical block address REQ_LBA1.

The comparator 235 may check the consecutive value (3) of the first requested logical block address REQ_LBA1. Therefore, the comparator 235 may output as many mapping entries Mapping_ENT as the consecutive value (3) of the first requested logical block address REQ_LBA1. That is, the comparator 235 may output the fourteenth and fifteenth mapping entries Mapping_ENT14 and Mapping_ENT15 that are two consecutively input mapping entries, after the comparator 235 outputs the thirteenth mapping entry Mapping_ENT13 corresponding to the first requested logical block address REQ_LBA1. The fourteenth and fifteenth mapping entries Mapping_ENT14 and Mapping_ENT15 may be output without being compared with the second and third requested logical block addresses REQ_LBA2 and REQ_LBA3.

Since all the first to third requested logical block addresses REQ_LBA1 to REQ_LBA3 correspond to mapping entries Mapping_ENT input to the comparator 235, the comparator 235 may not receive a mapping entry Mapping_ENT from the map data received from the map data receiver 210. Specifically, since the thirteenth to fifteenth mapping entries Mapping_ENT13 to 15 have been output, the comparator 235 may no longer receive any mapping entry Mapping_ENT. Therefore, the twenty-second to twenty-fourth mapping entries Mapping_ENT22 to 24 included in the second map data MAP_DATA2 may not be output to the comparator 235.

Figure 9:
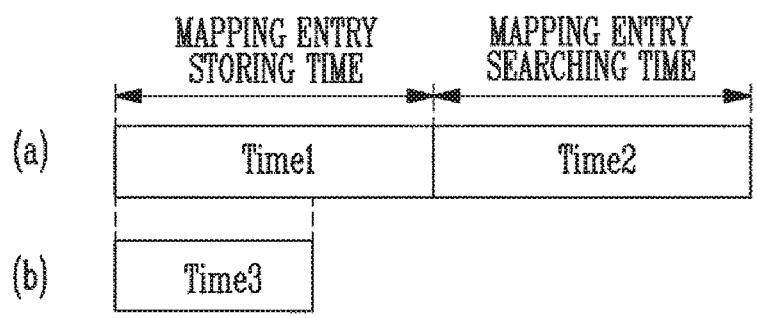
FIG. 9 is a diagram illustrating an operation time of the memory controller shown in FIG. 2.

FIG. 9 is a diagram illustrating an operation time of the memory controller shown in FIG. 2.

Referring to FIG. 9, (a) illustrates an operation time of the memory controller 200 when mapping entries Mapping_ENT are stored (i.e., cached) in the buffer memory 220, and the mapping entries Mapping_ENT stored in the buffer memory 220 are searched for a mapping entry having a requested logical block address REQ_LBA. (b) illustrates an operation time of the memory controller 200 when the mapping entries Mapping_ENT are searched for a mapping entry having a requested logical block address REQ_LBA while being stored in the buffer memory 220.

In (a) shown in FIG. 9, the buffer memory 220 may receive map data MAP_DATA from the map data receiver 210. Specifically, the buffer memory 220 may store mapping entries Mapping_ENT included in the map data MAP_DATA, which number corresponds to the capacity of the buffer memory 220. The time for which the buffer memory 220 stores the mapping entries Mapping_ENT may be a first time Time1.

When the map data MAP_DATA is stored in the buffer memory 220, the buffer memory 220 may search the stored (i.e., cached) mapping entries Mapping_ENT included in the map data MAP_DATA for a mapping entry having a requested logical block address REQ_LBA. The requested logical block address REQ_LBA may be provided along with the request message REQ_MSG from the host 300. The time for which the buffer memory 220 searches for a mapping entry Mapping_ENT having the requested logical block address REQ_LBA may be a second time Time2. The second time Time2 may be variable.

Consequently, when the mapping entry Mapping_ENT having the requested logical block address REQ_LBA among the mapping entries Mapping_ENT stored in the buffer memory 220 is searched, the operation time of the memory controller 200 may be a sum of the first time Time1 for the buffer memory 220 to store the mapping entries Mapping_ENT and the second time Time2 in which the buffer memory 220 searches for the mapping entry Mapping_ENT having the requested logical block address REQ_LBA.

In (b) shown in FIG. 9, the map data controller 230 may sequentially receive the mapping entries Mapping_ENT included in the map data MAP_DATA from the map data receiver 210. The mapping entries Mapping_ENT may be provided to the map data controller 230 while being cached in the buffer memory 220. Since the map data controller 230 does not use the cache-completed mapping entries Mapping_ENT from the buffer memory 220 but the being-cached mapping entries Mapping_ENT, the operation time of the memory controller 200 may be reduced by a time for storing (i.e., caching) the mapping entries Mapping_ENT into the buffer memory 220.

Consequently, when the map entries Mapping_ENT, which are being cached from the map data receiver 210 into the buffer memory 220, are searched for a mapping entry having a requested logical block address REQ_LBA, the operation time of the memory controller 200 may include only a third time Time3 that is a time for which the mapping entry is searched. Therefore, the operation time of the memory controller 200 may be a time except the time for which the mapping entry Mapping_ENT is stored. The third time Time3 may be variable.

Figure 10:
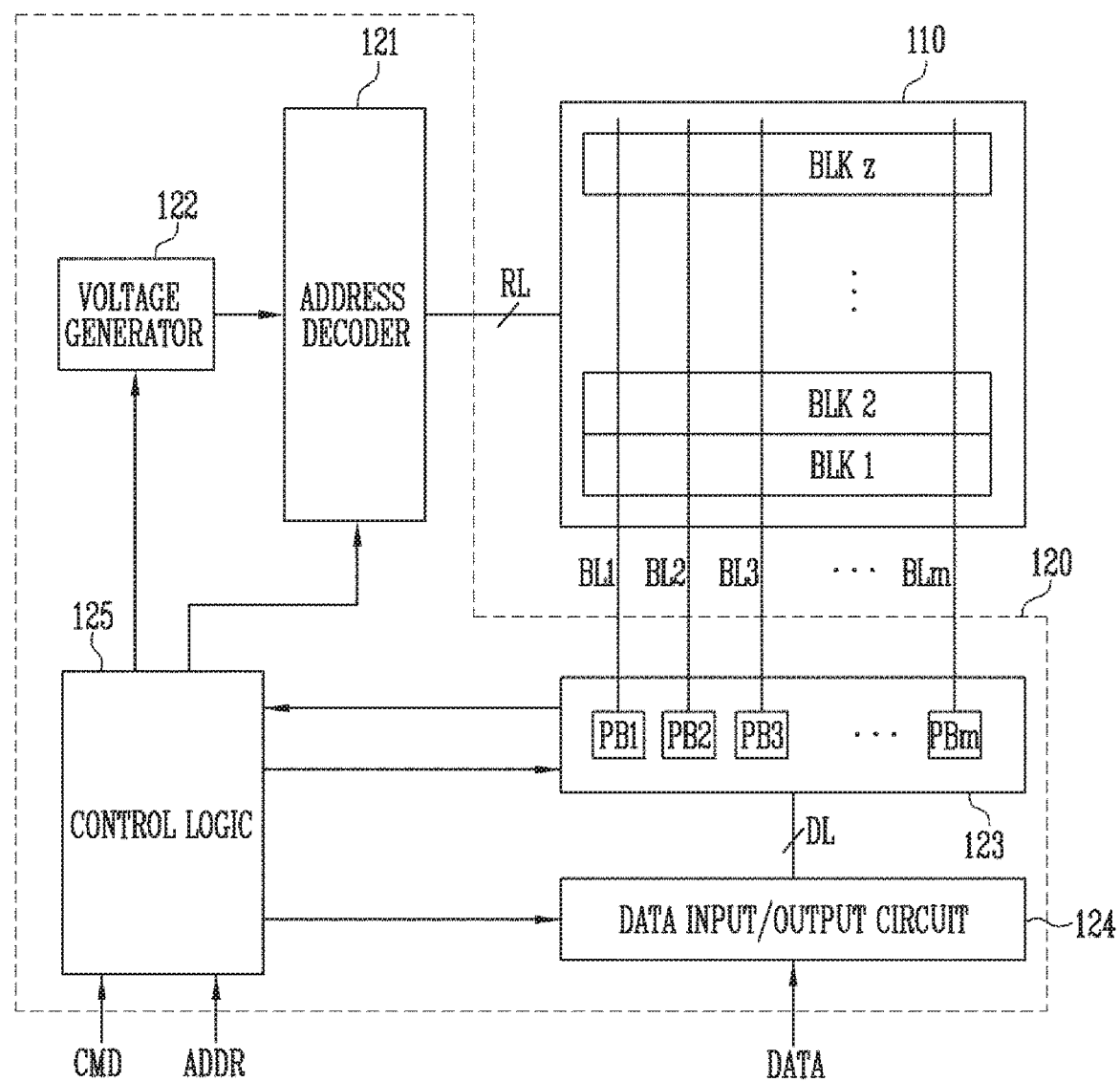
FIG. 10 is a block diagram illustrating a structure of a memory device shown in FIG. 1.

FIG. 10 is a block diagram illustrating a structure of the memory device shown in FIG. 1.

Referring to FIG. 10, the memory device 100 includes a memory cell array 110, a peripheral circuit 120, and a control logic 125.

The memory cell array 110 may include a plurality of memory blocks BLK1 to BLKz. The plurality of memory blocks BLK1 to BLKz are coupled to an address decoder 121 through row lines RL, and are coupled to a read/write circuit 123 through bit lines BL1 to BLm. Each of the plurality of memory blocks BLK1 to BLKz includes a plurality of memory cells. In an embodiment, the plurality of memory cells are nonvolatile memory cells.

A plurality of memory cells included in the memory cell array may be divided into a plurality of blocks according to usage thereof. System information such as various setting information necessary to control the memory device 100 may be stored in the plurality of blocks.

Each of first to zth memory blocks BLK1 to BLKz includes a plurality of cell strings. First to mth cell strings are coupled to first to mth bit lines BL1 to BLm, respectively. Each of the first to mth cell strings includes a drain select transistor, a plurality of memory cells coupled in series, and a source select transistor. The drain select transistor is coupled to a drain select line. First to nth memory cells are coupled to first to nth word lines. The source select transistor is coupled to a source select line. A drain side of the drain select transistor is coupled to a corresponding bit line. The drain select transistors of the first to mth cell strings are coupled to the first to mth bit lines BL1 to BLm, respectively. A source side of the source select transistor is coupled to a common source line. In an embodiment, the common source line may be commonly coupled to the first to zth memory blocks BLK1 to BLKz. The drain select line DSL, the first to nth word lines, and the source select line are included in the row lines RL. The drain select line DSL, the first to nth word lines, and the source select line are controlled by the address decoder 121. The common source line is controlled by the control logic 125. The first to mth bit lines BL1 to BLm are controlled by the read/write circuit 123.

The peripheral circuit 120 includes the address decoder 121, a voltage generator 122, the read/write circuit 123, a data input/output circuit 124, and the control logic 125.

The address decoder 121 is coupled to the memory cell array 110 through the row lines RL. The address decoder 121 is configured to operate under the control of the control logic 125. The address decoder 121 receives an address ADDR through the control logic 125.

In an embodiment, a program operation and a read operation of the memory device 100 are performed in units of pages.

In the program and read operations, the address ADDR received by the control logic 125 may include a block address and a row address. The address decoder 121 is configured to decode the block address in the received address ADDR. The address decoder 121 selects one memory block among the memory blocks BLK1 to BLKz according to the decoded block address.

The address decoder 121 is configured to decode the row address in the received address ADDR. The address decoder 121 selects one word line of a selected memory block by applying voltages provided from the voltage generator 122 to the row lines RL according to the decoded row address.

In an erase operation, the address ADDR includes a block address. The address decoder 121 decodes the block address, and selects one memory block according to the decoded block address. The erase operation may be performed on the whole or a portion of the one memory block.

In a partial erase operation, the address ADDR may include block and row addresses. The address decoder 121 selects one memory block among the memory blocks BLK1 to BLKz according to the block address.

The address decoder 121 is configured to decode the row addresses in the received address ADDR. The address decoder 121 selects at least one word line of the selected memory block by applying voltages provided from the voltage generator 122 to the row lines RL according to the decoded row addresses.

In an embodiment, the address decoder 121 may include a block decoder, a word line decoder, an address buffer, and the like.

The voltage generator 122 generates a plurality of voltages, using an external power voltage supplied to the memory device 100. The voltage generator 122 operates under the control of the control logic 125.

In an embodiment, the voltage generator 122 may generate an internal power voltage by regulating the external power voltage. The internal power voltage generated by the voltage generator 122 is used as an operating voltage of the memory device 100.

In an embodiment, the voltage generator 122 may generate a plurality of voltages, using the external power voltage or the internal power voltage.

For example, the voltage generator 122 may include a plurality of pumping capacitors for receiving the internal power voltage, and generate a plurality of voltages by selectively activating the plurality of pumping capacitors under the control of the control logic 130. The plurality of generated voltages are applied to word lines selected by the address decoder 121.

In a program operation, the voltage generator 122 may generate a high-voltage program pulse and a pass pulse lower than the program pulse. In a read operation, the voltage generator 122 may generate a read voltage and a pass voltage higher than the read voltage. In an erase operation, the voltage generator 122 may generate an erase voltage.

The read/write circuit 123 includes first to mth page buffers PB1 to PBm. The first to mth page buffers PB1 to PBm are coupled to the memory cell array 110 respectively through the first to mth bit lines BL1 to BLm. The first to mth page buffers PB1 to PBm operate under to control of the control logic 125.

The first to mth page buffers PB1 to PBm communicate data with the data input/output circuit 124. In a program operation, the first to mth page buffers PB1 to PBm receive data DATA to be stored through the data input/output circuit 124 and data lines DL.

In a program operation, when a program pulse is applied to a selected word line, the first to mth page buffers PB1 to PBm may transfer the data DATA received through the data input/out circuit 124 to selected memory cells through the bit lines BL1 to BLm. Memory cells of a selected page are programmed according to the transferred data DATA. A memory cell coupled to a bit line to which a program allow voltage (e.g., a ground voltage) is applied may have an increased threshold voltage. A threshold voltage of a memory cell coupled to a bit line to which a program inhibit voltage (e.g., a power voltage) is applied may be maintained. In a program verify operation, the first to mth page buffers PB1 to PBm read page data from selected memory cells through the bit lines BL1 to BLm.

In a read operation, the read/write circuit 123 reads data DATA from memory cells of a selected page through the bit lines BL, and outputs the read data DATA to the data input/output circuit 124. In an erase operation, the read/write circuit 123 may float the bit lines BL.

In an embodiment, the read/write circuit 123 may include a column select circuit.

The data input/output circuit 124 is coupled to the first to mth page buffers PB1 to PBm through the data lines DL. The data input/output circuit 124 operates under the control of the control logic 125. In a program operation, the data input/output circuit 124 receives data DATA to be stored from an external controller (not shown).

The control logic 125 is coupled to the address decoder 121, the voltage generator 122, the read/write circuit 123, and the data input/output circuit 124. The control logic 125 may control overall operations of the memory device 100. The control logic 125 receives a command CMD and an address ADDR. The control logic 125 controls the address decoder 121, the voltage generator 122, the read/write circuit 123, and the data input/output circuit 124 in response to the command CMD.

Figure 11:
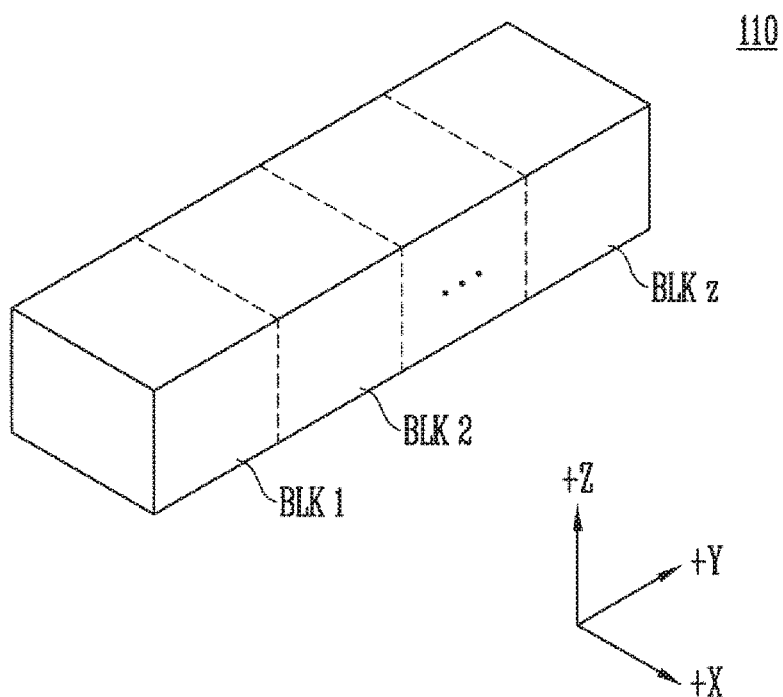
FIG. 11 is a diagram illustrating an embodiment of a memory cell array shown in FIG. 10.

FIG. 11 is a diagram illustrating an embodiment of the memory cell array shown in FIG. 10.

Referring to FIG. 11, the memory cell array 110 may include a plurality of memory blocks BLK1 to BLKz. Each memory block may have a three-dimensional structure. Each memory block may include a plurality of memory cells stacked on a substrate (not shown). The plurality of memory cells may be arranged along +X, +Y, and +Z directions. A structure of each memory block will be described in more detail with reference to FIGS. 12 and 13.

Figure 12:
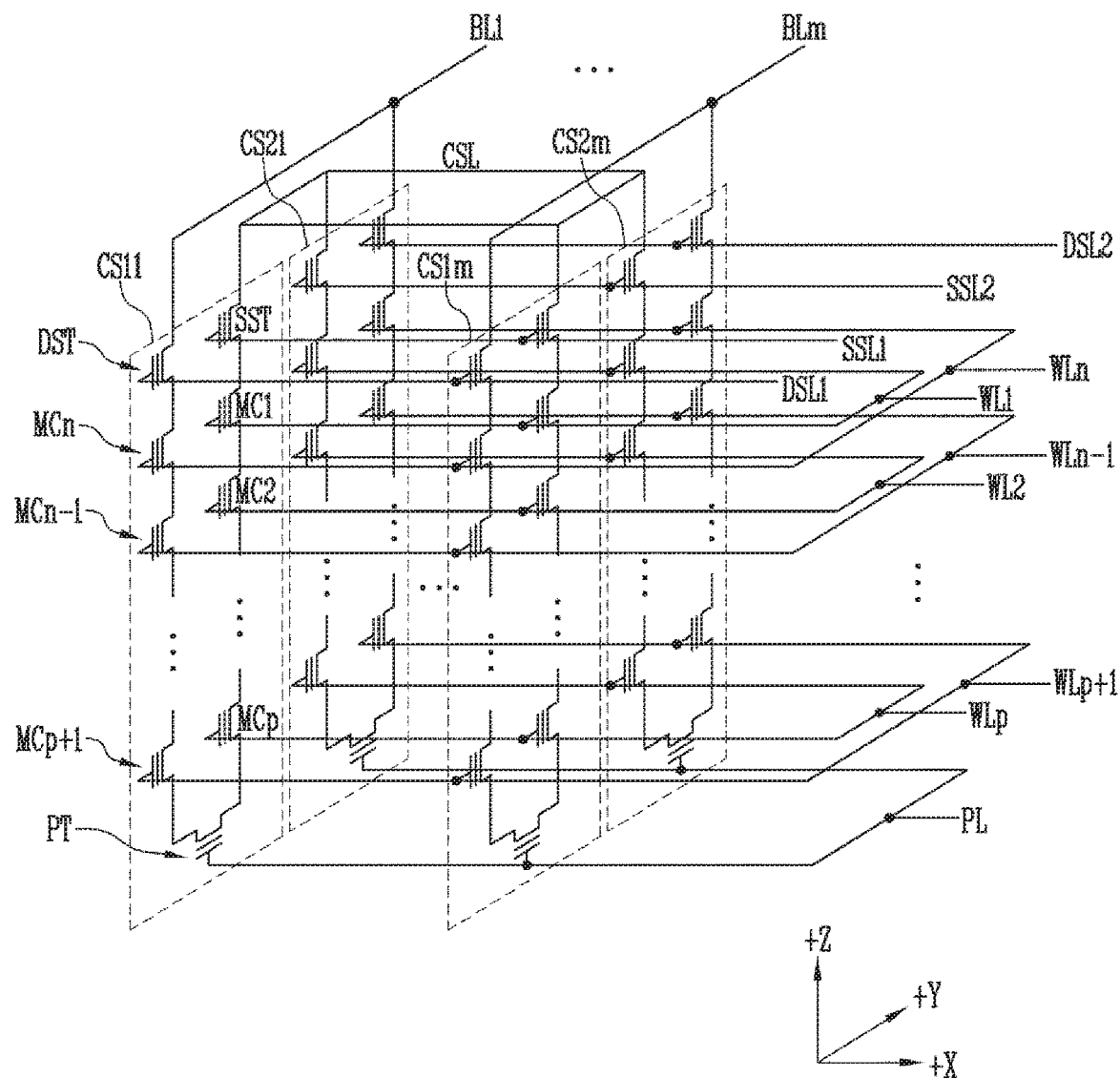
FIG. 12 is a circuit diagram illustrating any one memory block among memory blocks.

FIG. 12 is a circuit diagram illustrating any one memory block BLKa among memory blocks BLK1 to BLKz.

Referring to FIG. 12, the memory block BLKa may include a plurality of cell strings CS11 to CS1m and CS21 to CS2m. In an embodiment, each of the plurality of cell strings CS11 to CS1m and CS21 to CS2m may be formed in a 'U' shape. In the memory block BLKa, m cell strings are arranged in a row direction (i.e., a +X direction). FIG. 12 illustrates two cell strings arranged in a column direction (i.e., a +Y direction). However, this is for convenience of description, and it will be understood that three cell strings may be arranged in the column direction.

Each of the plurality of cell strings CS11 to CS1m and CS21 to CS2m may include at least one source select transistor SST, first to nth memory cells MC1 to MCn, a pipe transistor PT, and at least one drain select transistor DST.

The select transistors SST and DST and the memory cells MC1 to MCn may have structures similar to one another. In an embodiment, each of the select transistors SST and DST and the memory cells MC1 to MCn may include a channel layer, a tunneling insulating layer, a charge storage layer, and a blocking insulating layer. In an embodiment, a pillar for providing the channel layer may be provided in each cell string. In an embodiment, a pillar for providing at least one of the channel layer, the tunneling insulating layer, the charge storage layer, and the blocking insulating layer may be provided in each cell string.

The source select transistor SST of each cell string is coupled between a common source line CSL and memory cells MC1 to MCp.

In an embodiment, the source select transistors of cell strings arranged on the same row are coupled to a source select line extending in the row direction, and the source select transistors of cell strings arranged on different rows are coupled to different source select lines. In FIG. 12, the source select transistors of the cell strings CS11 to CS1m on a first row are coupled to a first source select line SSL1. The source select transistors of the cell strings CS21 to CS2m on a second row are coupled to a second source select line SSL2.

In another embodiment, the source select transistors of the cell strings CS11 to CS1m and CS21 to CS2m may be commonly coupled to one source select line.

The first to nth memory cells MC1 to MCn of each cell string are coupled between the source select transistor SST and the drain select transistor DST.

The first to nth memory cells MC1 to MCn may be divided into first to pth memory cells MC1 to MCp and a (p+1)th to nth memory cells MCp+1 to MCn. The first to pth memory cells MC1 to MCp are sequentially arranged in the opposite direction of a +Z direction, and are coupled in series between the source select transistor SST and the pipe transistor PT. The (p+1)th to nth memory cells MCp+1 to MCn are sequentially arranged in the +Z direction, and are coupled in series between the pipe transistor PT and the drain select transistor DST. The first to pth memory cells MC1 to MCp and the (p+1)th to nth memory cells MCp+1 to MCn are coupled through the pipe transistor PT. Gate electrodes of the first to nth memory cells MC1 to MCn of each cell string are coupled to first to nth word lines WL1 to WLn, respectively.

A gate of the pipe transistor PT of each cell string is coupled to a pipe line PL.

The drain select transistor DST of each cell string is coupled between a corresponding bit line and the memory cells MCp+1 to MCn. Cell strings arranged in the row direction are coupled to a drain select line extending in the row direction. The drain select transistors of the cell strings CS11 to CS1m on the first row are coupled to a first drain select line DSL1. The drain select transistors of the cell strings CS21 to CS2m on the second row are coupled to a second drain select line DSL2.

Cell strings arranged in the column direction are coupled to a bit line extending in the column direction. In FIG. 12, the cell strings CS11 and CS21 on a first column are coupled to a first bit line BL1. The cell strings CS1m and CS2m on an mth column are coupled to an mth bit line BLm.

Memory cells coupled to the same word line in the cell strings arranged in the row direction constitute one page. For example, memory cells coupled to the first word line WL1 in the cell strings CS11 to CS1m on the first row constitute one page. Memory cells coupled to the first word line WL1 in the cell strings CS21 to CS2m on the second row constitute another page. As any one of the drain select lines DSL1 and DSL2 is selected, cell strings arranged in one row direction may be selected. As any one of the word lines WL1 to WLn is selected, one page may be selected in the selected cell strings.

In another embodiment, even bit lines and odd bit lines may be provided instead of the first to mth bit lines BL1 to BLm. In addition, even-numbered cell strings among the cell strings CS11 to CS1m or CS21 to CS2m arranged in the row direction may be coupled to the even bit lines, respectively, and odd-numbered cell strings among the cell strings CS11 to CS1m or CS21 to CS2m arranged in the row direction may be coupled to the odd bit lines, respectively.

In an embodiment, at least one of the first to nth memory cells MC1 to MCn may be used as a dummy memory cell. For example, the at least one dummy memory cell may be provided to decrease an electric field between the source select transistor SST and the memory cells MC1 to MCp. Alternatively, the at least one dummy memory cell may be provided to decrease an electric field between the drain select transistor DST and the memory cells MCp+1 to MCn. When the number of dummy memory cells increases, the reliability of an operation of the memory block BLKa is improved. On the other hand, the size of the memory block BLKa increases. When the number of dummy memory cells decreases, the size of the memory block BLKa decreases. On the other hand, the reliability of an operation of the memory block BLKa may be deteriorated.

In order to efficiently control the at least one dummy memory cell, the dummy memory cells may have a required threshold voltage. Before or after an erase operation of the memory block BLKa, a program operation may be performed on all or some of the dummy memory cells. When an erase operation is performed after the program operation is performed, the threshold voltage of the dummy memory cells control a voltage applied to the dummy word lines coupled to the respective dummy memory cells, so that the dummy memory cells can have the required threshold voltage.

Figure 13:
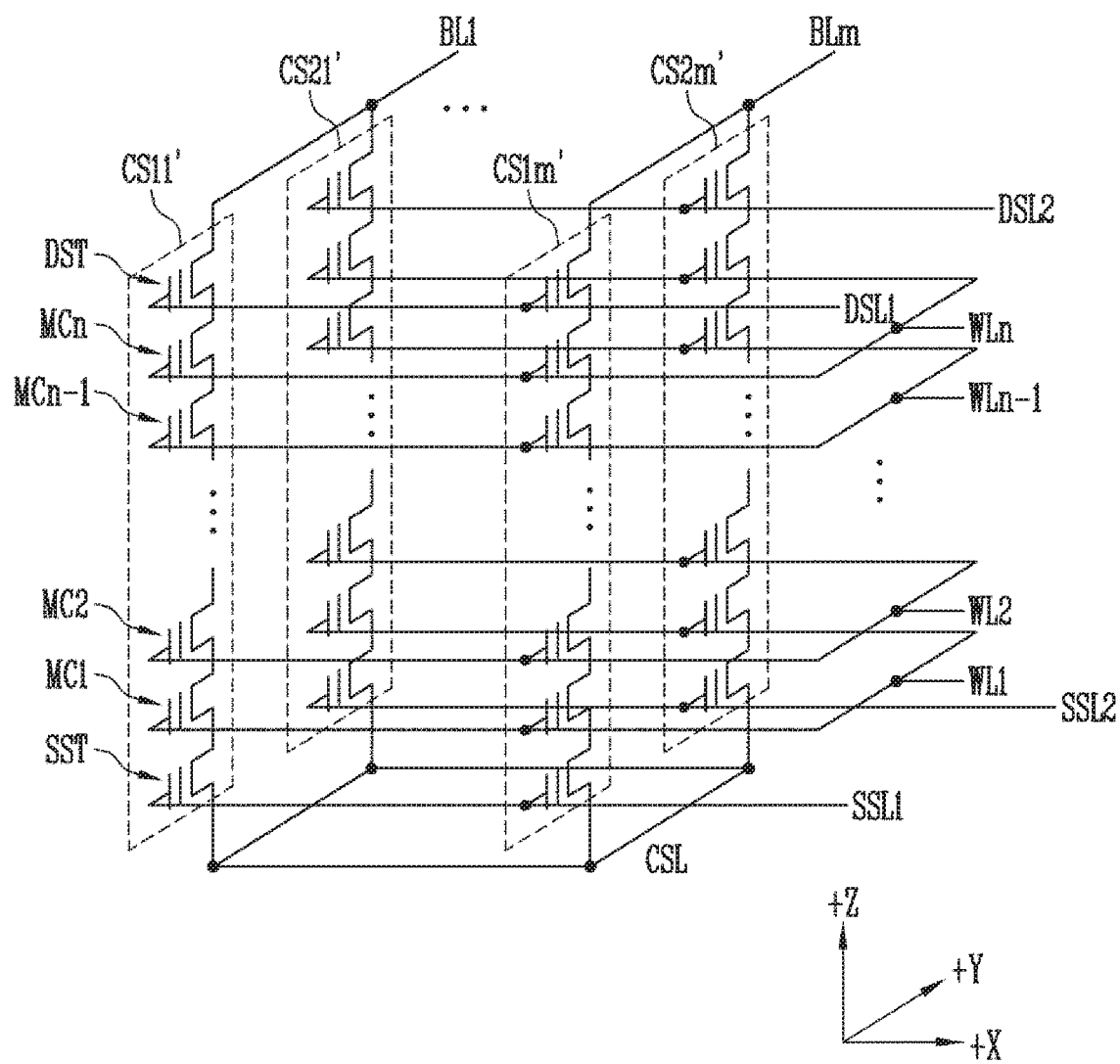
FIG. 13 is a circuit diagram illustrating another embodiment of the one memory block among the memory blocks.

FIG. 13 is a circuit diagram illustrating another embodiment BLKb of the one memory block among the memory blocks BLK1 to BLKz.

Referring to FIG. 13, the memory block BLKb may include a plurality of cell strings CS11' to CS1m' and CS21' to CS2m'. Each of the plurality of cell strings CS11' to CS1m' and CS21' to CS2m' extends along the +Z direction. Each of the plurality of cell strings CS11' to CS1m' and CS21' to CS2m' includes at least one source select transistor SST, first to nth memory cells MC1 to MCn, and at least one drain select transistor DST, which are stacked on a substrate (not shown) under the memory block BLKb.

The source select transistor SST of each cell string is coupled between a common source line CSL and the memory cells MC1 to MCn. The source select transistors of cell strings arranged on the same row are coupled to the same source select line. The source select transistors of the cell strings CS11' to CS1m' arranged on a first row are coupled to a first source select line SSL1. Source select transistors of the cell strings CS21' to CS2m' arranged on a second row are coupled to a second source select line SSL2. In another embodiment, the source select transistors of the cell strings CS11' to CS1m' and CS21' to CS2m' may be commonly coupled to one source select line.

The first to nth memory cells MC1 to MCn of each cell string are coupled in series between the source select transistor SST and the drain select transistor DST. Gate electrodes of the first to nth memory cells MC1 to MCn are coupled to first to nth word lines WL1 to WLn, respectively.

The drain select transistor DST of each cell string is coupled between a corresponding bit line and the memory cells MC1 to MCn. The drain select transistors of cell strings arranged in the row direction are coupled to a drain select line extending in the row direction. The drain select transistors of the cell strings CS11' to CS1m' on the first row are coupled to a first drain select line DSL1. The drain select transistors of the cell strings CS21' to CS2m' on the second row are coupled to a second drain select line DSL2.

Consequently, the memory block BLKb of FIG. 13 has a circuit similar to that of the memory block BLKa of FIG. 12, except that the pipe transistor PT is excluded from each cell string in FIG. 13.

In another embodiment, even bit lines and odd bit lines may be provided instead of the first to mth bit lines BL1 to BLm. In addition, even-numbered cell strings among the cell strings CS 11' to CS1m' or CS21' to CS2m' arranged in the row direction may be coupled to the even bit lines, respectively, and odd-numbered cell strings among the cell strings CS11' to CS1m' or CS21' to CS2m' arranged in the row direction may be coupled to the odd bit lines, respectively.

In an embodiment, at least one of the first to nth memory cells MC1 to MCn may be used as a dummy memory cell. For example, the at least one dummy memory cell may be provided to decrease an electric field between the source select transistor SST and the memory cells MC1 to MCp. Alternatively, the at least one dummy memory cell may be provided to decrease an electric field between the drain select transistor DST and the memory cells MCp+1 to MCn. When the number of dummy memory cells increases, the reliability of an operation of the memory block BLKb is improved. On the other hand, the size of the memory block BLKb is increased. When the number of dummy memory cells decreases, the size of the memory block BLKb decreases. On the other hand, the reliability of an operation of the memory block BLKb may be deteriorated.

In order to efficiently control the at least one dummy memory cell, the dummy memory cells may have a required threshold voltage. Before or after an erase operation of the memory block BLKb, a program operation may be performed on all or some of the dummy memory cells. When an erase operation is performed after the program operation is performed, the threshold voltage of the dummy memory cells control a voltage applied to the dummy word lines coupled to the respective dummy memory cells, so that the dummy memory cells can have the required threshold voltage.

Figure 14:
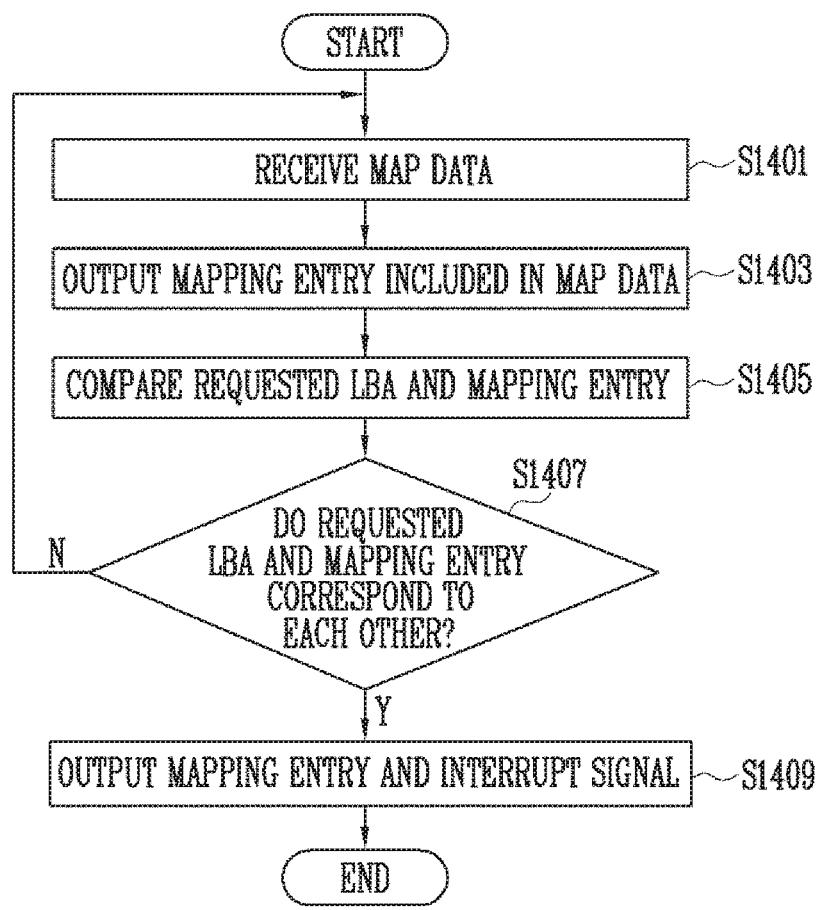
FIG. 14 is a diagram illustrating an operation of the memory controller in accordance with an embodiment of the present disclosure.

FIG. 14 is a diagram illustrating an operation of the memory controller in accordance with an embodiment of the present disclosure.

Referring to FIG. 14, in step S1401, the map data receiver 210 may receive map data MAP_DATA from the memory device 100. The map data MAP_DATA may be data stored in the map data storage 125 in the memory device 100. Also, the map data MAP_DATA may be configured with a plurality of mapping entries Mapping_ENT. Each mapping entry Mapping_ENT may represent a mapping relationship between a logical block address LBA and a physical block address PBA.

In step S1403, the map data receiver 210 may output mapping entries Mapping_ENT included in the map data MAP_DATA received from the memory device 100. The map data controller 230 may sequentially receive the mapping entries Mapping_ENT output from the map data receiver 210. The mapping entries Mapping_ENT may be stored in the mapping entry storage 231 included in the map data controller 230.

In step S1405, the comparator 235 may compare a requested logical block address REQ_LBA received from the requested logical address storage 233 and a mapping entry Mapping_ENT received from the mapping entry storage 231. Therefore, the comparator 235 may compare the requested logical block address REQ_LBA and an LBA included in the mapping entry Mapping_ENT.

In step S1407, it may be checked whether the requested logical block address REQ_LBA received from the requested logical address storage 233 and the mapping entry Mapping_ENT received from the mapping entry storage 231 correspond to each other. Whether the mapping entry Mapping_ENT has the requested logical block address REQ_LBA may represent whether the mapping entry Mapping_ENT corresponds to the requested logical block address REQ_LBA. Specifically, whether the mapping entry Mapping_ENT corresponds to the requested logical block address REQ_LBA may mean whether the mapping entry Mapping_ENT includes the requested logical block address REQ_LBA.

When the mapping entry Mapping_ENT has the requested logical block address REQ_LBA, the operation proceeds to S1409. When the requested logical block address REQ_LBA and the mapping entry Mapping_ENT do not correspond to each other, the operation proceeds to the step S1401. Therefore, when the requested logical block address REQ_LBA and the mapping entry Mapping_ENT do not correspond to each other, the comparator 235 may receive map data MAP_DATA. Specifically, the comparator 235 may receive a new mapping entry Mapping_ENT from the mapping entry storage 231.

In the step S1409, the comparator 235 may output a mapping entry Mapping_ENT and an interrupt signal INT_SIG. Specifically, when the mapping entry Mapping_ENT corresponds to the requested logical block address REQ_LBA, the comparator 235 may output the mapping entry Mapping_ENT and the interrupt signal INT_SIG. When the mapping entry Mapping_ENT corresponds to the requested logical block address REQ_LBA, the comparator 235 may output the mapping entry Mapping_ENT to the processor 240. Also, the comparator 235 may output the interrupt signal INT_SIG to the requested logical address storage 233.

The requested logical address storage 233 may set a marking value of a requested logical block address REQ_LBA corresponding to the interrupt signal INT_SIG. After the requested logical address storage 233 receives the interrupt signal INT_SIG, the requested logical address storage 233 may determine a requested logical block address REQ_LBA to be output, based on the marking value of the requested logical block address REQ_LBA. That is, the requested logical address storage 233 may output, to the comparator 235, at least one requested logical block address REQ_LBA except the requested logical block address REQ_LBA corresponding to the mapping entry Mapping_ENT.

Figure 15:
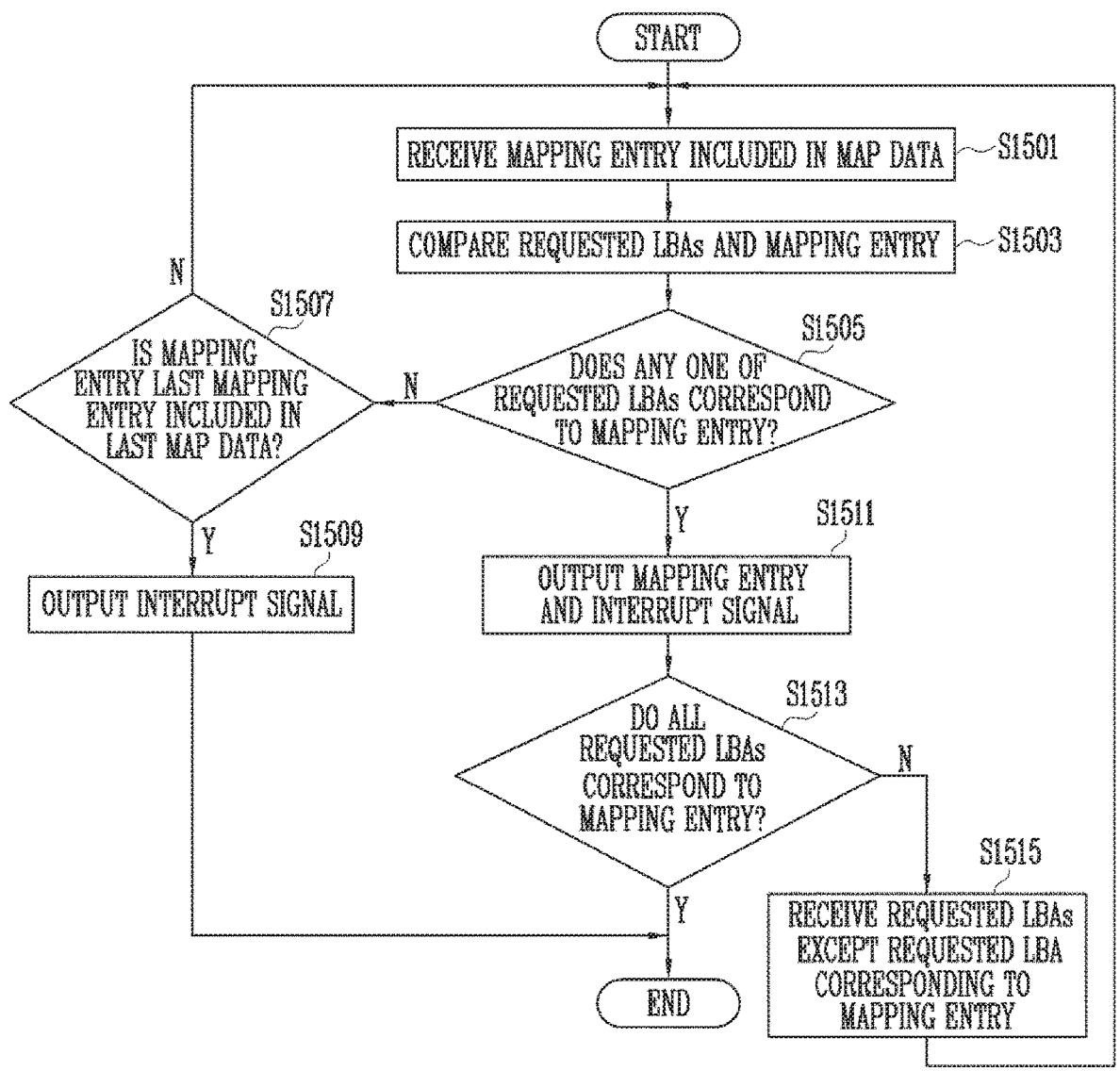
FIG. 15 is a diagram illustrating an operation of the memory controller in accordance with an embodiment of the present disclosure.

FIG. 15 is a diagram illustrating an operation of the memory controller in accordance with an embodiment of the present disclosure.

In FIG. 15, a case where a plurality of requested logical block addresses REQ_LBAs are provided is illustrated.

Referring to FIG. 15, in step S1501, the comparator 235 may receive a mapping entry Mapping_ENT included in a map data MAP_DATA. Specifically, the comparator 235 may sequentially receive mapping entries Mapping_ENT stored in the mapping entry storage 231. The mapping entry Mapping_ENT may be an entry included in the map data. The mapping entry Mapping_ENT may establish a mapping relationship between one LBA and one PBA.

In an embodiment, the comparator 235 may receive not only the mapping entry Mapping_ENT but also a requested logical block address REQ_LBA. Specifically, the comparator 235 may receive at least one requested logical block address REQ_LBA from the requested logical address storage 233.

The requested logical block address REQ_LBA may be provided along with the request message REQ_MSG from the host 300. The requested logical block address REQ_LBA may be provided in plurality.

In step S1503, the comparator 235 may compare the requested logical block addresses REQ_LBAs received from the requested logical address storage 233 and the mapping entry Mapping_ENT received from the mapping entry storage 231. The comparison between the requested logical block addresses REQ_LBAs and the mapping entry Mapping_ENT may mean comparison between each of the requested logical block addresses REQ_LBAs and an LBA included in the mapping entry Mapping_ENT.

In step S1505, the comparator 235 may determine whether any one of the requested logical block addresses REQ_LBAs received from the requested logical address storage 233 corresponds to the mapping entry Mapping_ENT. Specifically, whether any one of the requested logical block addresses REQ_LBAs corresponds to the mapping entry Mapping_ENT may mean whether the mapping entry Mapping_ENT corresponds to any one of the requested logical block addresses REQ_LBAs. The comparator 235 may determine whether each of the requested logical block addresses REQ_LBAs and the LBA included in the mapping entry Mapping_ENT correspond to each other.

When the mapping entry Mapping_ENT corresponds to any one of the requested logical block addresses REQ_LBAs, the operation proceeds to step S1511. When the mapping entry Mapping_ENT does not correspond to any one of the requested logical block addresses REQ_LBAs, the operation proceeds to step S1507.

In the step S1507, the comparator 235 may determine whether the mapping entry Mapping_ENT input to the comparator 235 is the last mapping entry Mapping_ENT included in the last map data MAP_DATA. When the comparator 235 receives the last mapping entry Mapping_ENT included in the last map data MAP_DATA, the comparator 235 may no longer receive any mapping entry Mapping_ENT.

When the mapping entry Mapping_ENT is the last mapping entry Mapping_ENT included in the last map data MAP_DATA, the operation proceeds to step S1509. When the mapping entry Mapping_ENT is not the last mapping entry Mapping_ENT included in the last map data MAP_DATA, the operation proceeds to the step S1501, and the comparator 235 may receive a next mapping entry Mapping_ENT included in the map data MAP_DATA.

In the step S1509, the comparator 235 may output an interrupt signal INT_SIG to the requested logical address storage 233. When the mapping entry Mapping_ENT corresponds to the requested logical block address REQ_LBA or when the mapping entry Mapping_ENT received by the comparator 235 is the last mapping entry Mapping_ENT included in the last map data MAP_DATA, the comparator 235 may output an interrupt signal INT_SIG. Specifically, the comparator 235 may represent, through the interrupt signal INT_SIG, that the last mapping entry Mapping_ENT included in the last map data MAP_DATA does not correspond to the requested logical block address REQ_LBA, and there is no mapping entry Mapping_ENT to be received. The requested logical address storage 233 may not output requested logical block addresses REQ_LBAs stored in the requested logical address storage 233 by receiving the interrupt signal INT_SIG.

In the step S1511, the comparator 235 may output a mapping entry Mapping_ENT and an interrupt signal INT_SIG. Specifically, when the mapping entry Mapping_ENT corresponds to the requested logical block address REQ_LBA, the comparator 235 may output the mapping entry Mapping_ENT to the processor 240. Also, when the mapping entry Mapping_ENT corresponds to the requested logical block address REQ_LBA, the comparator 235 may output the interrupt signal INT_SIG to the requested logical address storage 233.

The requested logical address storage 233 may receive an interrupt signal INT_SIG. The requested logical address storage 233 may set a marking value of a requested logical block address REQ_LBA corresponding to the interrupt signal INT_SIG. After the requested logical address storage 233 receives the interrupt signal INT_SIG, the requested logical address storage 233 may determine a requested logical block address REQ_LBA to be output, based on the marking value of the requested logical block address REQ_LBA. That is, the requested logical address storage 233 may output, to the comparator 235, at least one requested logical block address REQ_LBA except the requested logical block address REQ_LBA corresponding to the mapping entry Mapping_ENT.

In step S1513, it may be determined whether all the target entries received from the requested logical address storage 233 correspond to the mapping entry Mapping_ENT. Whether all the target entries correspond to the mapping entry Mapping_ENT may mean that mapping entries Mapping_ENT corresponding to all the requested logical block addresses REQ_LBAs have been output. That is, it may be determined whether all the mapping entries Mapping_ENT corresponding to the requested logical block addresses REQ_LBAs have been output to the processor so as to perform an operation corresponding to the request message REQ_MSG from the host 300. When all the requested logical block addresses REQ_LBAs do not correspond to the mapping entry Mapping_ENT, the operation proceeds to step S1515.

In the step S1515, the comparator 235 may receive the requested logical block addresses REQ_LBAs except the requested logical block address REQ_LBA corresponding to the mapping entry Mapping_ENT. That is, the comparator 235 may receive the requested logical block addresses REQ_LBAs except the requested logical block address REQ_LBA corresponding to the mapping entry Mapping_ENT. Specifically, after the comparator 235 outputs the mapping entry Mapping_ENT to the processor 240, the comparator 235 may receive requested logical block addresses REQ_LBAs except the requested logical block address REQ_LBA corresponding to the mapping entry Mapping_ENT from the requested logical address storage 233. Also, the comparator 235 may receive a next mapping entry Mapping_ENT stored in the mapping entry storage 231 (see S1501). Therefore, the comparator 235 may compare the requested logical block addresses REQ_LBAs and the next mapping entry Mapping_ENT.

The comparator 235 may receive next mapping entries Mapping_ENT from the mapping entry storage 231 until mapping entries Mapping_ENT input to the comparator 235 correspond to a plurality of requested logical block addresses REQ_LBAs.

Figure 16:
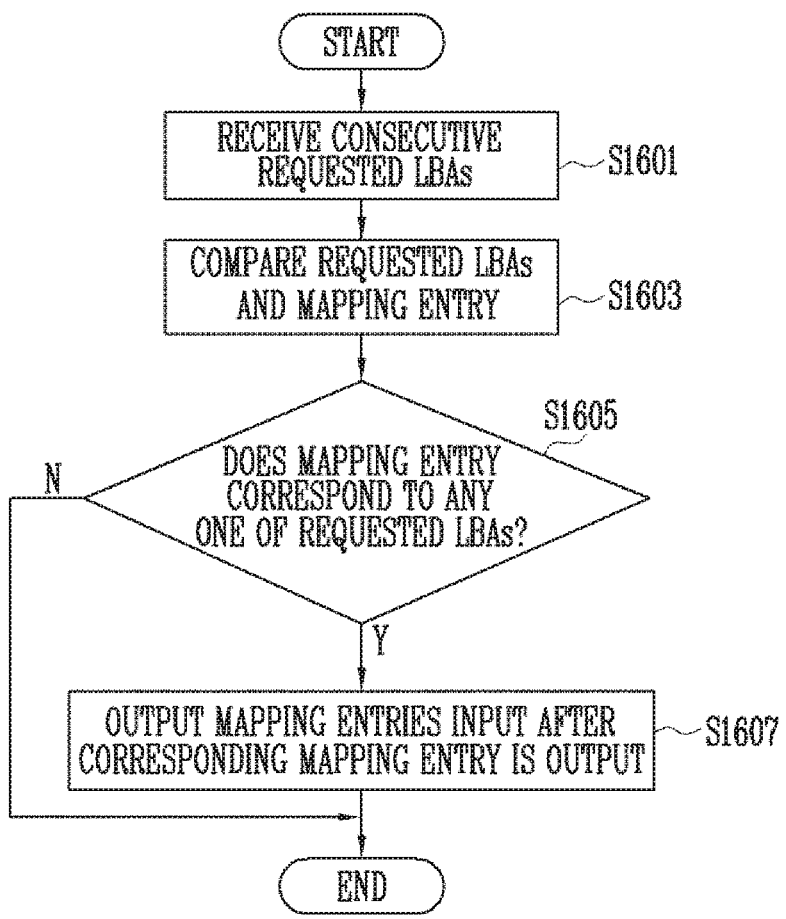
FIG. 16 is a diagram illustrating an operation of the memory controller in accordance with an embodiment of the present disclosure.

FIG. 16 is a diagram illustrating an operation of the memory controller in accordance with an embodiment of the present disclosure.

Referring to FIG. 16, in step S1601, the comparator 235 may receive consecutive requested logical block addresses REQ_LBAs. Specifically, the comparator 235 may receive consecutive requested logical block addresses REQ_LBAs stored in the requested logical address storage 231. The requested logical block address REQ_LBA may be provided along with the request message REQ_MSG from the host 300. The requested logical block address REQ_LBA may be provided in plurality.

In an embodiment, the comparator 235 may receive not only the consecutive requested logical block addresses REQ_LBAs but also a mapping entry Mapping_ENT. Specifically, the comparator 235 may sequentially receive mapping entries Mapping_ENT from the mapping entry storage 231. The mapping entry Mapping_ENT may be an entry included in map data. The mapping entry Mapping_ENT may represent a mapping relationship between one LBA and one PBA.

In step S1603, the comparator 235 may compare consecutive requested logical block addresses REQ_LBAs received from the requested logical address storage 233 and a mapping entry Mapping_ENT received from the mapping entry storage 231. The comparison between the consecutive requested logical block addresses REQ_LBAs and the mapping entry Mapping_ENT may mean comparison between a starting LBA among the consecutive requested logical block addresses REQ_LBAs and the mapping entry Mapping_ENT. Specifically, the comparison between the consecutive requested logical block addresses REQ_LBAs and the mapping entry Mapping_ENT may mean comparison between the starting LBA of the requested LBAs REQ_LBAs and an LBA included in the mapping entry Mapping_ENT.

In step S1605, it may be determined whether any one of the requested logical block addresses REQ_LBAs and the mapping entry Mapping_ENT correspond to each other. That is, it may be determined whether the mapping entry Mapping_ENT corresponds to any one of the requested logical block addresses REQ_LBAs. Specifically, since the requested logical block addresses REQ_LBAs are consecutive, it may be determined whether the mapping entry Mapping_ENT corresponds to the starting LBA among the consecutive requested logical block addresses REQ_LBAs. Therefore, it may be determined whether the starting LBA of the requested LBAs REQ_LBAs and the LBA included in the mapping entry Mapping_ENT correspond to each other.

When the mapping entry Mapping_ENT corresponds to any one of the requested logical block addresses REQ_LBAs, the operation proceeds to step S1607.

In the step S1607, after the comparator 235 outputs the corresponding mapping entry Mapping_ENT, the comparator 235 may output mapping entries Mapping_ENT input therein. That is, the comparator 235 may output mapping entries Mapping_ENT input after the comparator 235 outputs the mapping entry Mapping_ENT having the requested logical block address REQ_LBA.

Specifically, the comparator 235 may output as many mapping entries Mapping_ENT as a consecutive value of the starting LBA among the consecutive requested logical block addresses REQ_LBAs. The comparator 235 may check the consecutive value of the starting LBA of the requested LBAs REQ_LBAs. Therefore, the comparator 235 may output as many mapping entries Mapping_ENT as the consecutive value of the starting LBA of the requested LBAs REQ_LBAs.

That is, after the comparator 235 outputs the mapping entries Mapping_ENT corresponding to the starting LBA of the consecutive requested LBAs REQ_LBAs, the comparator 235 may output consecutively input mapping entries Mapping_ENT. The output mapping entries may be output without being compared with the target entries.

Figure 17:
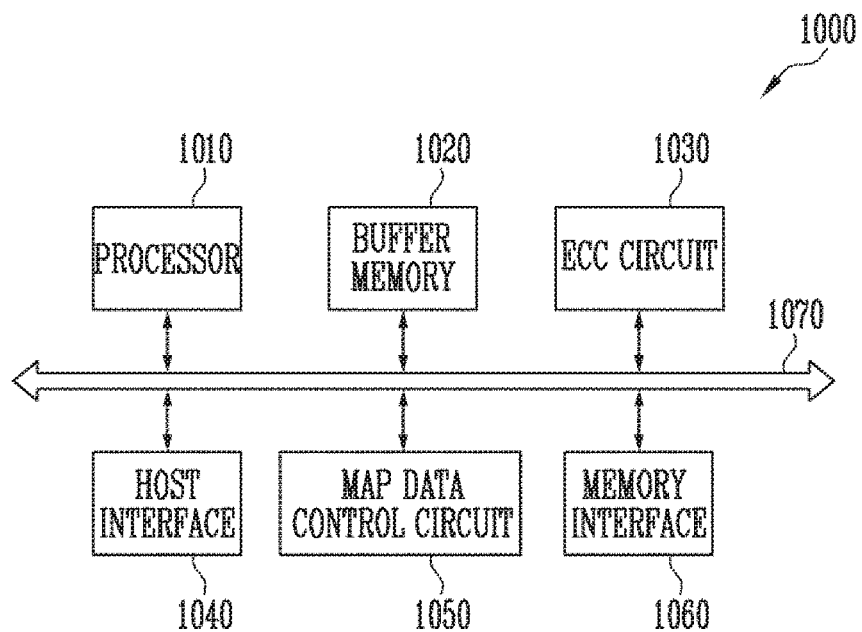
FIG. 17 is a diagram illustrating another embodiment of the memory controller shown in FIG. 1.

FIG. 17 is a diagram illustrating another embodiment of the memory controller shown in FIG. 1.

A memory controller 1000 is coupled to a host and a memory device. The memory controller 1000 is configured to access the memory device in response to a request received from the host. For example, the memory controller 1000 is configured to control read, program, erase, and background operations of the memory device. The memory controller 1000 is configured to provide an interface between the memory device and the host. The memory controller 1000 is configured to drive firmware for controlling the memory device.

Referring to FIG. 17, the memory controller 1000 may include a processor 1010, a buffer memory 1020, an error correction code (ECC) circuit 1030, a host interface 1040, a map data control circuit 1050, a memory interface 1060, and a bus 1070.

The bus 1070 may be configured to provide channels between components of the memory controller 1000.

The processor 1010 may control overall operations of the memory controller 1000, and perform a logical operation. The processor 1010 may communicate with the external host through the host interface 1040, and communicate with the memory device through the memory interface 1060. Also, the processor 1010 may communicate with the map data control circuit 1050 and the buffer memory 1020. The processor 1010 may control an operation of the storage device, using the buffer memory 1020 as a working memory, a cache memory or a buffer memory.

The processor 1010 may perform a function of a flash translation layer (FTL). The processor 1010 may translate a logical block address (LBA) provided by the host through the FTL into a physical block address (PBA). The FTL may receive an LBA, using a mapping table, to be translated into a PBA. Several address mapping methods of the FTL exist according to mapping units. A representative address mapping method includes a page mapping method, a block mapping method, and a hybrid mapping method.

The processor 1010 may receive a request message REQ_MSG from the host. The processor 1010 may output a requested logical block address REQ_LBA to the map data control circuit 1050 and/or the buffer memory 1020 so as to perform an operation corresponding to the request message REQ_MSG received from the host. The requested logical block address REQ_LBA may be provided along with the request message REQ_MSG from the host.

The processor 1010 may receive a mapping entry Mapping_ENT having the requested logical block address REQ_LBA from the map data control circuit 1050 and/or the buffer memory 1020. The mapping entry Mapping_ENT may establish a mapping relationship between one LBA and one PBA. Therefore, the mapping entry Mapping_ENT received by the processor 1010 may include a mapping relationship between one LBA and one PBA.

Consequently, the processor 1010 may receive a mapping entry Mapping_ENT from the map data control circuit 1050 and/or the buffer memory 1020, and output an LBA included in the mapping entry Mapping_ENT to the memory device. The memory device may perform an operation corresponding to the request message REQ_MSG from the host by receiving the received LBA.

The processor 1010 is configured to randomize data received from the host. For example, the processor 1010 may randomize data received from the host, using a randomizing seed. The randomized data is provided as data to be stored to the memory device to be programmed in the memory cell array.

In a read operation, the processor 1010 is configured to derandomize data received from the memory device. For example, the processor 1010 may derandomize data received from the memory device, using a derandomizing seed. The derandomized data may be output to the host.

In an embodiment, the processor 1010 may perform randomizing and derandomizing by driving software or firmware.

The buffer memory 1020 may be used as the working memory, the cache memory, or the buffer memory of the processor 1010. The buffer memory 1020 may store codes and commands, which are executed by the processor 1010. The buffer memory 1020 may include a Static RAM (SRAM) or a Dynamic RAM (DRAM).

The buffer memory 1020 may store mapping entries Mapping_ENT included in map data MAP_DATA received from the map data receiver 210, which number corresponds to the capacity of the buffer memory 1020. Also, the buffer memory 1020 may receive a requested logical block address REQ_LBA from the processor 1010.

When the mapping entries Mapping_ENT are stored in the buffer memory 1020, the buffer memory 1020 may search for a mapping entry Mapping_ENT having the requested logical block address REQ_LBA among the mapping entries Mapping_ENT. Whether the mapping entry Mapping_ENT has the requested logical block address REQ_LBA may mean whether the mapping entry Mapping_ENT includes the requested logical block address REQ_LBA. The buffer memory 1020 may output the mapping entry Mapping_ENT having the requested logical block address REQ_LBA to the processor 1010.

The ECC circuit 1030 may perform an ECC operation. The ECC circuit 1030 may perform ECC encoding on data to be written in the memory device through the memory interface 1060. The ECC encoded data may be transferred to the memory device through the memory interface 1060. The ECC circuit 1030 may perform ECC decoding on data received from the memory device through the memory interface 1060. In an example, the ECC circuit 1030 may be included as a component of the memory interface 1060 in the memory interface 1060.

The host interface 1040 may communicate with the external host under the control of the processor 1010. The host interface 1040 may communicate with the host, using at least one of various communication manners, such as a Universal Serial bus (USB), a Serial AT Attachment (SATA), a High Speed InterChip (HSIC), a Small Computer System Interface (SCSI), Firewire, a Peripheral Component Interconnection (PCI), a PCI express (PCIe), a nonvolatile memory express (NVMe), a Universal Flash Storage (UFS), a Secure Digital (SD), a Multi-Media Card (MMC), an embedded MMC (eMMC), a Dual In-line Memory Module (DIMM), a Registered DIMM (RDIMM), and a Load Reduced DIMM (LRDIMM).

The map data control circuit 1050 may receive a requested logical block address REQ_LBA. The map data control circuit 1050 may search for a mapping entry Mapping_ENT having the requested logical block address REQ_LBA among mapping entries Mapping_ENT under the control of the processor 1010. Whether the mapping entry Mapping_ENT has the requested logical block address REQ_LBA may mean whether the mapping entry Mapping_ENT includes the requested logical block address REQ_LBA. The map data control circuit 1050 may output the mapping entry Mapping_ENT having the requested logical block address REQ_LBA to the processor 1010.

The memory interface 1060 communicates with the memory device under the control of the processor 1010. The memory interface 1060 may communicate a command, an address, and data with the memory device through a channel. The memory interface 1060 may include the map data receiver 210. That is, the map data receiver 210 may receive map data MAP_DATA from the memory device, and output the received map data MAP_DATA. The map data MAP_DATA may include mapping entries Mapping_ENT. The mapping entry Mapping_ENT may establish a mapping relationship between one LBA and one PBA.

The map data receiver 210 may output the map data MAP_DATA received from the memory device to the map data control circuit 1050 and/or the buffer memory 1020. Specifically, the map data receiver 210 may output the mapping entries Mapping_ENT included in the map data MAP_DATA to the map data control circuit 1050 and/or the buffer memory 1020.

In an example, the memory controller 1000 may not include the buffer memory 1020.

When the memory controller 1000 does not include the buffer memory 1020, the memory controller 1000 does not store the mapping entries Mapping_ENT, but may perform an operation of searching for a mapping entry Mapping_ENT having a corresponding requested logical block address REQ_LBA. Thus, since the mapping entries Mapping_ENT are not stored in the buffer memory 1020, the operation time of the memory controller 1000 can be reduced by a time for storing the mapping entries Mapping_ENT.

Consequently, when a mapping entry Mapping_ENT having the requested logical block address REQ_LBA is found among the mapping entries Mapping_ENT included in the map data MAP_DATA, the operation time of the memory controller 1000 may include only a time for searching for the mapping entry. Therefore, the operation time of the memory controller 1000 may be a time except the time for storing the mapping entry Mapping_ENT. Since the operation time of the memory controller 1000 is a time for searching for the mapping entry, the operation time of the memory controller 1000 may be variable.

In an example, the processor 1010 may control an operation of the memory controller 1000 by using codes. The processor 1010 may load codes from a nonvolatile memory device (e.g., a read only memory (ROM)) provided in the memory controller 1000. In another example, the processor 1010 may load codes from the memory device through the memory interface 1060.

In an example, the bus 1070 of the memory controller 1000 may be divided into a control bus and a data bus. The data bus may be configured to transmit data in the memory controller 1000, and the control bus may be configured to transmit control information such as a command and an address in the memory controller 1000. The data bus and the control bus are separated from each other, and may not interfere or influence with each other. The data bus may be coupled to the host interface 1040, the map data control circuit 1050, the ECC circuit 1030, and the memory interface 1060. The control bus may be coupled to the host interface 1040, the processor 1010, the map data control circuit 1050, the buffer memory 1020, and the memory interface 1060.

Figure 18:
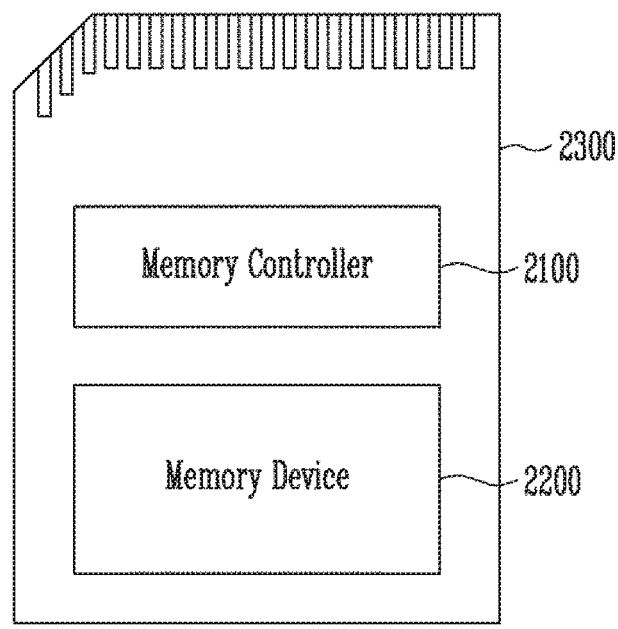
FIG. 18 is a block diagram illustrating a memory card system to which the storage device is applied in accordance with an embodiment of the present disclosure.

FIG. 18 is a block diagram illustrating a memory card system to which the storage device is applied in accordance with an embodiment of the present disclosure.

Referring to FIG. 18, the memory card system 2000 includes a memory controller 2100, a memory device 2200, and a connector 2300.

The memory controller 2100 is coupled to the memory device 2200. The memory controller 2100 is configured to access the memory device 2200. For example, the memory controller 2100 is configured to control read, write, erase, and background operations of the memory device 2200. The memory controller 2100 is configured to provide an interface between the memory device 2200 and a host. The memory controller 2100 is configured to driver firmware for controlling the memory device 2200. The memory device 2200 may be implemented identically to the memory device 100 described with reference to FIG. 10.

In an example, the memory controller 2100 may include components such as a Random Access Memory (RAM), a processing unit, a host interface, a memory interface, and an ECC circuit.

The memory controller 2100 may communicate with an external device through the connector 2300. The memory controller 2100 may communicate with the external device (e.g., the host) according to a specific communication protocol. In an example, the memory controller 2100 may communicate with the external device through at least one of various communication protocols such as a Universal Serial Bus (USB), a Multi-Media Card (MMC), an embedded MMC (eMMC), a Peripheral Component Interconnection (PCI), a PCI express (PCIe), an Advanced Technology Attachment (ATA), a Serial-ATA (SATA), a Parallel-ATA (PATA), a Small Computer System Interface (SCSI), an Enhanced Small Disk Interface (ESDI), an Integrated Drive Electronics (IDE), firewire, a Universal Flash Storage (UFS), Wi-Fi, Bluetooth, and NVMe.

In an example, the memory device 2200 may be implemented with various nonvolatile memory devices such as an Electrically Erasable and Programmable ROM (EEPROM), a NAND flash memory, a NOR flash memory, a Phase-change RAM (PRAM), a Resistive RAM (ReRAM), a Ferroelectric RAM (FRAM), and a Spin Torque Transfer magnetic RAM (STT-MRAM).

The memory controller 2100 and the memory device 2200 may be integrated into a single semiconductor device, to constitute a memory card. For example, the memory controller 2100 and the memory device 2200 may constitute a memory card such as a PC card (Personal Computer Memory Card International Association (PCMCIA)), a Compact Flash (CF) card, a Smart Media Card (SM and SMC), a memory stick, a Multi-Media Card (MMC, RS-MMC, MMCmicro and eMMC), an SD card (SD, miniSD, microSD and SDHC), and a Universal Flash Storage (UFS).

Figure 19:
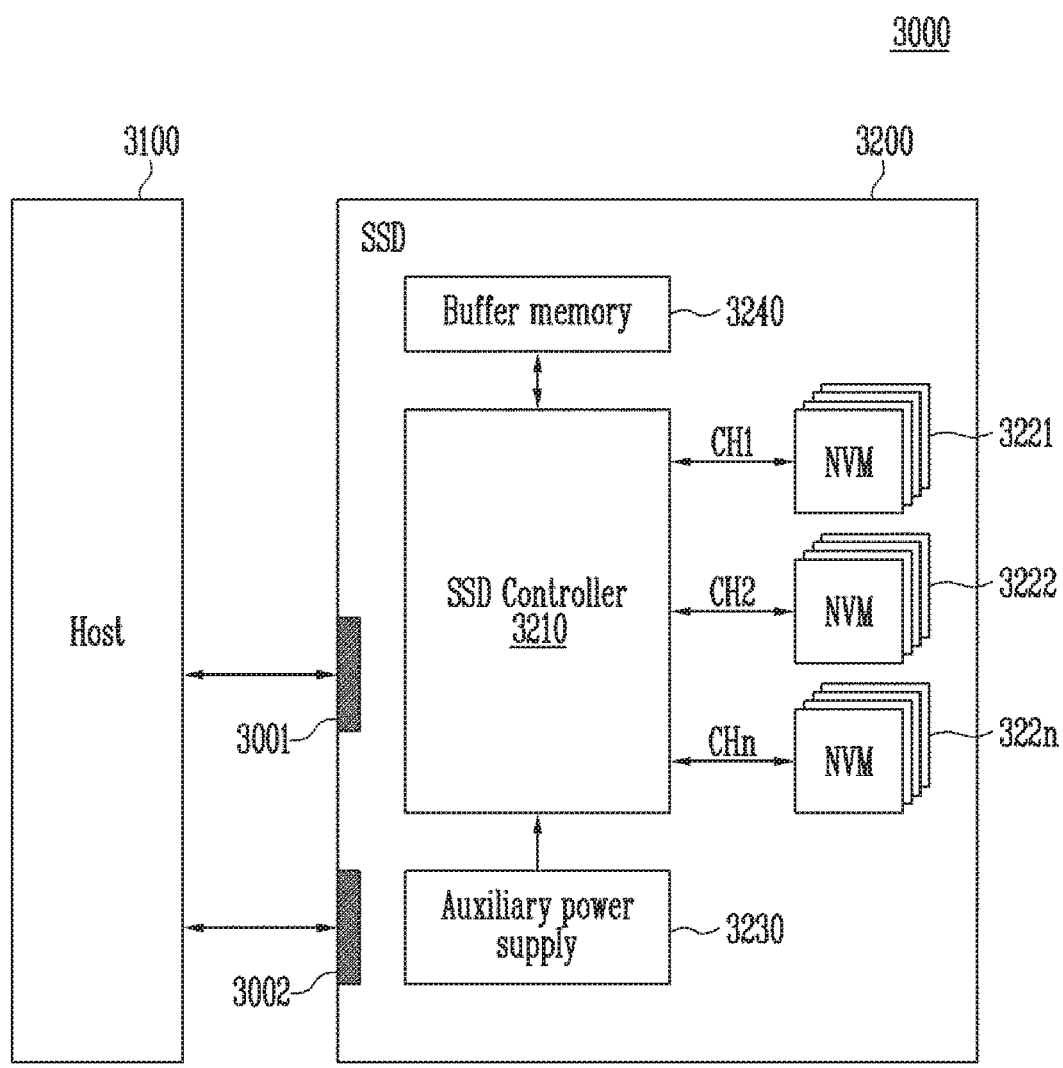
FIG. 19 is a block diagram exemplarily illustrating a Solid State Drive (SSD) system to which the storage device is applied in accordance with an embodiment of the present disclosure.

FIG. 19 is a block diagram exemplarily illustrating a Solid State Drive (SSD) system to which the storage device is applied in accordance with an embodiment of the present disclosure.

Referring to FIG. 19, the SSD system 3000 includes a host 3100 and an SSD 3200. The SSD 3200 exchanges a signal SIG with the host 3100 through a signal connector 3001, and receives power PWR through a power connector 3002. The SSD 3200 includes an SSD controller 3210, a plurality of flash memories 3221 to 322n, an auxiliary power supply 3230, and a buffer memory 3240.

In an embodiment, the SSD controller 3210 may serve as the memory controller 200 described with reference to FIG. 1.

The SSD controller 3210 may control the plurality of flash memories 3221 to 322n in response to a signal SIG received from the host 3100. In an example, the signal SIG may be a signal based on an interface between the host 3100 and the SSD 3200. For example, the signal SIG may be a signal defined by at least one of interfaces such as a Universal Serial Bus (USB), a Multi-Media Card (MMC), an embedded MMC (eMMC), a Peripheral Component Interconnection (PCI), a PCI express (PCIe), an Advanced Technology Attachment (ATA), a Serial-ATA (SATA), a Parallel-ATA (PATA), a Small Computer System Interface (SCSI), an Enhanced Small Disk Interface (ESDI), an Integrated Drive Electronics (IDE), a firewire, a Universal Flash Storage (UFS), a WI-FI, a Bluetooth, and an NVMe.

The auxiliary power supply 3230 is coupled to the host 3100 through the power connector 3002. When the supply of power from the host 3100 is not smooth, the auxiliary power supply 3230 may provide power of the SSD 3200. In an example, the auxiliary power supply 3230 may be located in the SSD 3200, or be located at the outside of the SSD 3200. For example, the auxiliary power supply 3230 may be located on a main board, and provide auxiliary power to the SSD 3200.

The buffer memory 3240 operates as a buffer memory of the SSD 3200. For example, the buffer memory 3240 may temporarily store data received from the host 3100 or data received from the plurality of flash memories 3221 to 322n, or temporarily store meta data (e.g., a mapping table) of the flash memories 3221 to 322n. The buffer memory 3240 may include volatile memories such as a DRAM, an SDRAM, a DDR SDRAM, an LPDDR SDRAM, and a GRAM or nonvolatile memories such as a FRAM, a ReRAM, an STT-MRAM, and a PRAM.

Figure 20:
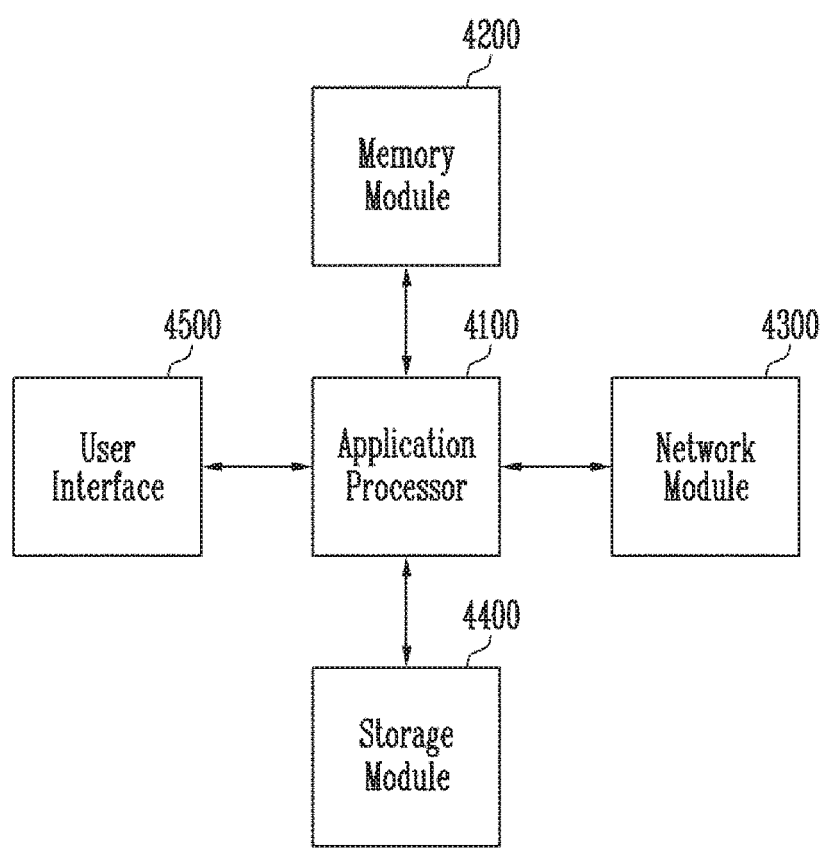
FIG. 20 is a block diagram illustrating a user system to which the storage device is applied in accordance with an embodiment of the present disclosure.

FIG. 20 is a block diagram illustrating a user system to which the storage device is applied in accordance with an embodiment of the present disclosure.

Referring to FIG. 20, the user system 4000 includes an application processor 4100, a memory module 4200, a network module 4300, a storage module 4400, and a user interface 4500.

The application processor 4100 may drive components included in the user system 4000, an operating system (OS), a user program, or the like. In an example, the application processor 4100 may include controllers for controlling components included in the user system 4000, interfaces, a graphic engine, and the like. The application processor 4100 may be provided as a System-on-Chip (SoC).

The memory module 4200 may operate as a main memory, working memory, buffer memory or cache memory of the user system 4000. The memory module 4200 may include volatile random access memories such as a DRAM, an SDRAM, a DDR SDRAM, a DDR2 SDRM, a DDR3 SDRAM, an LPDDR SDRAM, an LPDDR2 SDRAM, and an LPDDR3 SDRAM or nonvolatile random access memories such as a PRAM, a ReRAM, an MRAM, and a FRAM. In an example, the application processor 4100 and the memory module 4200 may be provided as one semiconductor package by being packaged based on a Package on Package (PoP).

The network module 4300 may communicate with external devices. In an example, the network module 4300 may support wireless communications such as Code Division Multiple Access (CDMA), Global System for Mobile communication (GSM), Wideband CDMA (WCDMA), CDMA-2000, Time Division Multiple Access (TDMA), Long Term Evolution (LTE), Wimax, WLAN, UWB, Bluetooth, and Wi-Fi. In an example, the network module 4300 may be included in the application processor 4100.

The storage module 4400 may store data. For example, the storage module 4400 may store data received from the application processor 4100. Alternatively, the storage module 4400 may transmit data stored therein to the application processor 4100. In an example, the storage module 4400 may be implemented with a nonvolatile semiconductor memory device such as a Phase-change RAM (PRAM), a Magnetic RAM (MRAM), a Resistive RAM (ReRAM), a NAND flash, a NOR flash, or a NAND flash having a three-dimensional structure. In an example, the storage module 4400 may be provided as a removable drive such as a memory card of the user system 4000 or an external drive.

In an example, the storage module 4400 may include a plurality of nonvolatile memory devices, and the plurality of nonvolatile memory devices may operate identically to the memory device described with reference to FIG. 9. The storage module 4400 may operate identically to the storage device 50 described with reference to FIG. 1.

The user interface 4500 may include interfaces for inputting data or commands to the application processor 4100 or outputting data to an external device. In an example, the user interface 4500 may include user input interfaces such as a keyboard, a keypad, a button, a touch panel, a touch screen, a touch pad, a touch ball, a camera, a microphone, a gyroscope sensor, a vibration sensor and a piezoelectric element. The user interface 4500 may include user output interfaces such as a Liquid Crystal Display (LCD), an Organic Light Emitting Diode (OLED) display device, an Active Matrix OLED (AMOLED) display device, an LED, a speaker, and a monitor.

In accordance with the present disclosure, there can be provided a memory controller having an improved operating speed and an operating method thereof.

While the present disclosure has been shown and described with reference to certain exemplary embodiments thereof, it will be understood by those skilled in the art that various changes in form and details may be made therein without departing from the spirit and scope of the present disclosure as defined by the appended claims and their equivalents. Therefore, the scope of the present disclosure should not be limited to the above-described exemplary embodiments but should be determined by not only the appended claims but also the equivalents thereof.

In the above-described embodiments, all steps may be selectively performed or part of the steps may be omitted. In each embodiment, the steps are not necessarily performed in accordance with the described order and may be rearranged. The embodiments disclosed in this specification and drawings are only examples to facilitate an understanding of the present disclosure, and the present disclosure is not limited thereto. That is, it should be apparent to those skilled in the art that various modifications can be made on the basis of the technological scope of the present disclosure.

Meanwhile, the exemplary embodiments of the present disclosure have been described in the drawings and specification. Although specific terminologies are used here, those are only to describe the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein.

It should be understood that many variations and modifications of the basic inventive concept described herein will still fall within the spirit and scope of the present disclosure as defined in the appended claims and their equivalents.

What is claimed is:

1. A memory controller for controlling a memory device in response to a read request from a host, the memory controller comprising:
    a buffer memory;
    a map data controller;
    a map data receiver configured to communicate with the memory device; and
    a processor configured to receive the read request, and to control the map data receiver to, receive a plurality of mapping entries included in map data read from the memory device, transfer the plurality of mapping entries to both the buffer memory and the map data controller, and provide a requested logical block address corresponding to the read request to the map data controller, wherein the map data controller, concurrently with the plurality of mapping entries being transferred to the buffer memory, is configured to detect a mapping entry of the requested logical block address among the plurality of mapping entries, and to output an interrupt signal to the processor in response to detection of the mapping entry of the requested logical block address.

2. The memory controller of claim 1, wherein the map data controller includes:
a mapping entry storage configured to store the plurality of mapping entries in order received from the map data receiver;
a requested logical block address storage configured to store the requested logical block address; and
a comparator configured to compare the requested logical block address with the plurality of mapping entries to detect the mapping entry corresponding to the read request.

3. The memory controller of claim 2, wherein the comparator compares, when the requested logical block address is provided in plurality, each of a plurality of requested logical block addresses with each of the plurality of mapping entries.

4. The memory controller of claim 3, wherein the comparator receives new mapping entries from the mapping entry storage until all mapping entries corresponding to the plurality of requested logical block addresses are received.

5. The memory controller of claim 3, wherein the comparator:
outputs, to the processor, any one mapping entry among the plurality of mapping entries, which corresponds to any one of the plurality of requested logical block addresses; and
outputs, to the requested logical block address storage, the interrupt signal representing that any one mapping entry among the plurality of mapping entries, which corresponds to any one of the plurality of requested logical block addresses, has been output.

6. The memory controller of claim 5, wherein the requested logical block address storage outputs another requested logical block address except the one requested logical block address among the plurality of requested logical block addresses to the comparator, corresponding to the interrupt signal.

7. The memory controller of claim 3, wherein, when any one mapping entry among the plurality of mapping entries corresponds to any one requested logical block address among the plurality of requested logical block addresses, the comparator stores the one mapping entry among the plurality of mapping entries.

8. The memory controller of claim 7, wherein the comparator stores all mapping entries, among the plurality of mapping entries, which respectively correspond to the plurality of requested logical block addresses, and outputs the mapping entries to the processor.

9. The memory controller of claim 3, wherein, when the plurality of requested logical block addresses are consecutive entries, and a first entry among the consecutive entries corresponds to any one mapping entry among the plurality of mapping entries, the comparator outputs the one mapping entry among the plurality of mapping entries and then consecutively outputs mapping entries which number corresponds to the number of the plurality of requested logical block addresses.

10. The memory controller of claim 1, further comprising a channel through which the map data receiver and the buffer memory are coupled to each other,
wherein the map data receiver transmits the map data to the buffer memory through the channel, and
wherein the map data controller receives the map data transmitted through the channel to detect the mapping entry corresponding to the read request.

11. A method for operating a memory controller for controlling a memory device in response to a read request from a host, the method comprising:
receiving map data including a plurality of mapping entries read from the memory device;
transferring the plurality of mapping entries to both a buffer memory and a map data controller included in the memory controller;
concurrently with transferring the plurality of mapping entries to the buffer memory, detecting, by the map data controller, a mapping entry of a requested logical block address corresponding to the read request among the plurality of mapping entries; and
outputting, by the map data controller, an interrupt signal representing that the mapping entry of the requested logical block address has been detected in response to detection of the mapping entry of the requested logical block address.

12. The method of claim 11, wherein the outputting of the interrupt signal includes comparing, when the requested logical block address is provided in plurality, each of a plurality of requested logical block addresses with each of the plurality of mapping entries.

13. The method of claim 12, further comprising:
comparing the plurality of requested logical block addresses with any one mapping entry among the plurality of mapping entries and then receiving new mapping entries among the plurality of mapping entries; and
receiving another requested logical block address except any one requested logical block address among the plurality of requested logical block addresses, corresponding to the interrupt signal.

14. The method of claim 12, further comprising, when any one mapping entry corresponds to any one requested logical block address among the plurality of requested logical block addresses, storing the corresponding mapping entry.

15. The method of claim 14, further comprising, when all mapping entries respectively corresponding to the plurality of requested logical block addresses are stored, outputting the corresponding mapping entries.

16. An operating method of a memory controller, the operating method comprising:
transferring plural map entries read from a memory device to both a buffer memory and a map data controller included in the memory controller, each map entry representing a mapping relationship between a logical address and a physical address;
concurrently with transferring the plural map entries to the buffer memory, detecting, by the map data controller, in order outputted during the transferring, a map entry having a requested logical address provided from the host among the plural map entries;

outputting, by the map data controller, an interrupt signal to a processor included in the memory controller when the map entry having the requested logical address is detected; and controlling the memory device to perform an operation according to the map entry having the requested logical address in response to a read request provided along with the requested logical address from the host.

\* \* \* \* \*